US012210206B2

(12) United States Patent
Lai et al.

(10) Patent No.: US 12,210,206 B2
(45) Date of Patent: Jan. 28, 2025

(54) OPTICAL ELEMENT DRIVING UNIT, IMAGING OPTICAL MODULE AND ELECTRONIC DEVICE

(71) Applicant: LARGAN DIGITAL CO., LTD., Taichung (TW)

(72) Inventors: Yu Chen Lai, Taichung (TW); Ming-Ta Chou, Taichung (TW); Te-Sheng Tseng, Taichung (TW)

(73) Assignee: LARGAN DIGITAL CO., LTD., Taichung (TW)

( * ) Notice: Subject to any disclaimer, the term of this patent is extended or adjusted under 35 U.S.C. 154(b) by 685 days.

(21) Appl. No.: 17/458,050

(22) Filed: Aug. 26, 2021

(65) Prior Publication Data
US 2023/0003963 A1    Jan. 5, 2023

(30) Foreign Application Priority Data
Jul. 2, 2021    (TW) .................. 110124385

(51) Int. Cl.
*G02B 7/02*    (2021.01)
*G02B 7/08*    (2021.01)
(Continued)

(52) U.S. Cl.
CPC ............. *G02B 7/023* (2013.01); *G02B 7/026* (2013.01); *G02B 7/08* (2013.01); *G03B 5/02* (2013.01);
(Continued)

(58) Field of Classification Search
CPC .......... G02B 7/023; G02B 7/026; G02B 7/08; G02B 7/021; G02B 27/646; G02B 7/04;
(Continued)

(56) References Cited

U.S. PATENT DOCUMENTS 9,413,933 B2    8/2016  Yu et al.
9,726,851 B2    8/2017  Hu
(Continued)

FOREIGN PATENT DOCUMENTS

CN    104902149 A    9/2015
CN    104954638 A    9/2015
(Continued)

OTHER PUBLICATIONS

Machine translation of JP 2014160195 A, retrieved electronically from Espacenet Jun. 17, 2024 (Year: 2024).*
(Continued)

*Primary Examiner* — Cara E Rakowski
(74) *Attorney, Agent, or Firm* — Maschoff Brennan

(57) ABSTRACT

An optical element driving unit includes a stationary body, a carrier, a supporting mechanism and an electromagnetic driving assembly. The supporting mechanism is connected to the carrier and the stationary body and provides the carrier with a degree of freedom of movement relative to the stationary body. The carrier can be driven to move by the electromagnetic driving assembly. The electromagnetic driving assembly includes a driving coil, a driving magnet and a ferromagnetic element. The driving coil is disposed on the carrier. The driving magnet is disposed on the stationary body. The ferromagnetic element is one-piece formed and embedded in the carrier, and the ferromagnetic element includes a magnetic field guiding part and an electrical connection part. The magnetic field guiding part faces the driving coil and/or the driving magnet. The electrical connection part is exposed on a surface of the carrier and electrically connected to the driving coil.

15 Claims, 48 Drawing Sheets

(51) Int. Cl.
*G03B 5/02* (2021.01)
*H02K 41/035* (2006.01)
*H04N 23/51* (2023.01)

(52) U.S. Cl.
CPC ......... *H02K 41/0354* (2013.01); *H04N 23/51* (2023.01); *G03B 2205/0069* (2013.01)

(58) Field of Classification Search
CPC ............... H02K 41/0354; H02K 33/18; G03B 2205/0069
See application file for complete search history.

(56) References Cited

U.S. PATENT DOCUMENTS

| | | | |
|---|---|---|---|
| 10,185,115 | B2 | 1/2019 | Wang et al. |
| 10,451,836 | B2 | 10/2019 | Cho et al. |
| 10,962,735 | B2 | 3/2021 | Wang et al. |
| 2011/0310501 | A1* | 12/2011 | Min .................. G02B 7/04 359/824 |
| 2014/0078350 | A1 | 3/2014 | Aoki |
| 2019/0363623 | A1* | 11/2019 | Wauke .............. H05K 1/0277 |
| 2020/0249544 | A1 | 8/2020 | Wang et al. |
| 2021/0318592 | A1* | 10/2021 | Kim .................. H04N 23/55 |

FOREIGN PATENT DOCUMENTS

| | | |
|---|---|---|
| CN | 106461905 A | 2/2017 |
| JP | 2002169073 A | 6/2002 |
| JP | 2011-085682 A | 4/2011 |
| JP | 2014160195 A * | 9/2014 |

OTHER PUBLICATIONS

Indian Examination Report dated Feb. 3, 2023 as received in application No. 202134057387.

* cited by examiner

OPTICAL ELEMENT DRIVING UNIT, IMAGING OPTICAL MODULE AND ELECTRONIC DEVICE

RELATED APPLICATIONS

This application claims priority to Taiwan Application 110124385, filed on Jul. 2, 2021, which is incorporated by reference herein in its entirety.

BACKGROUND

Technical Field

The present disclosure relates to an optical element driving unit, an imaging optical module and an electronic device, more particularly to an optical element driving unit and an imaging optical module applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays. Furthermore, due to the rapid changes in technology, electronic devices equipped with optical systems are trending towards multi-functionality for various applications, and therefore the functionality requirements for the optical systems have been increasing.

In recent years, there is an increasing demand for electronic devices featuring compact size, but conventional optical systems are difficult to meet both the requirements of high image quality and compactness. Conventional camera modules usually have functionalities such as auto focus, optical image stabilization and optical zoom. However, in order to achieve the above functionalities, the structure of the camera modules becomes more complex and the size thereof also increases, and thus, the size of electronic devices equipped with the camera modules also increases. Usually, it is difficult to install a driving mechanism that can effectively drive optical elements to move in a limited storage space of a conventional optical lens system, so that the requirement of miniaturization of the optical lens system may be compromised in order to increase the storage space for the driving mechanism to be installed therein and thereby an effective driving force for driving the optical elements can be provided by the driving mechanism.

SUMMARY

According to one aspect of the present disclosure, an optical element driving unit includes a stationary body, a carrier, a supporting mechanism and an electromagnetic driving assembly. The carrier is configured for at least one optical element to be disposed thereon, and the carrier has at least one degree of freedom of movement relative to the stationary body. The supporting mechanism is connected to the carrier and the stationary body, and the supporting mechanism provides the carrier with the at least one degree of freedom of movement relative to the stationary body. The electromagnetic driving assembly is configured to move the carrier relative to the stationary body. The electromagnetic driving assembly includes a driving coil, a driving magnet and a ferromagnetic element. The driving coil is disposed on the carrier. The driving magnet is disposed on the stationary body and disposed corresponding to the driving coil. The ferromagnetic element is embedded in the carrier, and the ferromagnetic element has the at least one degree of freedom of movement relative to the stationary body. The ferromagnetic element is one-piece formed and includes a magnetic field guiding part and a first electrical connection part. The magnetic field guiding part faces at least one of the driving coil and the driving magnet. The first electrical connection part is exposed on a surface of the carrier, and the first electrical connection part is electrically connected to the driving coil.

According to another aspect of the present disclosure, an imaging optical module includes the aforementioned optical element driving unit and an imaging assembly. The imaging assembly includes optical element(s) arranged along an imaging light path.

According to another aspect of the present disclosure, an electronic device includes the aforementioned imaging optical module and an image sensor. The image sensor is disposed on an image surface of the imaging optical module

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
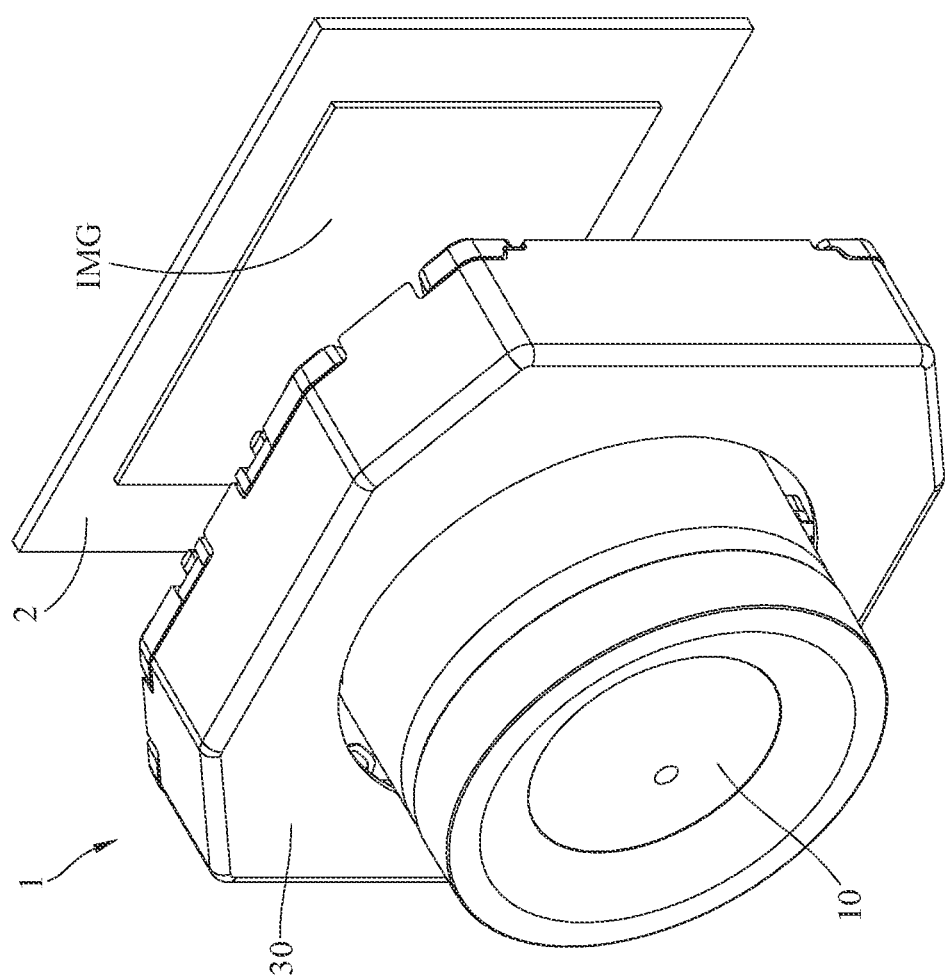
FIG. 1 is perspective view of an imaging optical module and an image sensor according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides an optical element driving unit. The optical element driving unit includes a stationary body, a carrier, a supporting mechanism and an electromagnetic driving assembly. The carrier is configured for at least one optical element to be disposed thereon, and the carrier has at least one degree of freedom of movement relative to the stationary body. The optical element can be a lens element, a mirror, a light shielding element, a prism or a filter. Furthermore, the carrier can be considered, for example, a lens carrier and a prism carrier in accordance with the type of optical element. Moreover, the stationary body can be, for example, a casing, a platform, or another carrier served as a basis for the aforementioned carrier. The supporting mechanism is connected to the carrier and the stationary body, and the supporting mechanism provides the carrier with said at least one degree of freedom of movement relative to the stationary body.

The electromagnetic driving assembly is configured to move the carrier relative to the stationary body. The electromagnetic driving assembly includes a driving coil, a driving magnet and a ferromagnetic element. The driving coil is disposed on the carrier. The driving magnet is disposed on the stationary body and disposed corresponding to the driving coil. The ferromagnetic element is embedded in the carrier, such that the ferromagnetic element with the carrier enjoys the at least one degree of freedom of movement. Moreover, the ferromagnetic element can be integrally formed with the carrier. Specifically, the ferromagnetic element can be embedded in the carrier via, for example, insert molding process. However, the present disclosure is not limited to the above manner. In some other configurations, the ferromagnetic element can be embedded in the carrier (thermoplastic carrier) by, for example, hot riveting process. The ferromagnetic element is one-piece formed and includes a magnetic field guiding part and a first electrical connection part. The magnetic field guiding part faces at least one of the driving coil and the driving magnet. The first electrical connection part is exposed on the surface of the carrier. The first electrical connection part is electrically connected to the driving coil. Therefore, the ferromagnetic element has both functions of magnetic field guidance and circuit connection, so that the number of components of the optical element driving unit can be minimized so as to increase manufacturing efficiency.

According to the present disclosure, by adding an electrically conductive ferromagnetic element disposed on the carrier, the optical element driving unit can guide the magnetic field distribution of the electromagnetic driving assembly so as to increase the driving force and improve the arrangement of the driving coil in a limited space while satisfying the requirement of electrical connection of the driving coil, so that the design flexibility can be increased.

The driving magnet can have a corresponsive surface facing both the magnetic field guiding part and the driving coil, and the magnetic field guiding part is located farther away from the corresponsive surface than the driving coil to the corresponsive surface. Therefore, owing to the arrangement described above, the magnetic field distribution of the driving magnet can be properly guided so as to increase the magnetic flux through the driving coil.

The magnetic field guiding part of the ferromagnetic element can be surrounded by the driving coil. Therefore, owing to the arrangement described above, the magnetic field guiding part can be magnetized by the driving coil so as to increase the magnetic field intensity of the driving coil.

The supporting mechanism can include a flat spring, and the flat spring is electrically conductive. The ferromagnetic element can further include a second electrical connection part. The second electrical connection part is connected to the flat spring, and the flat spring and the driving coil are electrically connected in series via the second electrical connection part and the first electrical connection part. Therefore, the driving coil and the flat spring can be prevented from direct contact with each other, which may affect the flatness of the flat spring, so as to increase assembly yield rate; furthermore, the arrangements of the flat spring and the driving coil in a limited space can be improved while satisfying the requirement of electrical connections of the flat spring and the driving coil, so that the design flexibility can be increased.

The second electrical connection part can include a contact portion and an elastic portion. The contact portion is in physical contact with the flat spring, and the elastic portion is connected to the contact portion and constantly exerts an elastic force on the contact portion towards the flat spring. Therefore, the electrical connection between the ferromagnetic element and the flat spring can be achieved and the warpage of flat spring occurring during a welding process can be prevented so as to increase assembly yield rate.

The carrier can include a barrel part and a mounting part. The optical element is disposed on the barrel part, and the barrel part, the supporting mechanism, the driving coil and the ferromagnetic element are all disposed on the mounting part. Therefore, the optical element can be disposed on the barrel part first, and then, the optical elements and the barrel part are together disposed on the mounting part so as to improve manufacturing process. However, the present disclosure is not limited to the above configuration where the carrier is a two-piece component. In some other embodiments, the carrier can be one-piece formed by injection molding process, and the carrier includes an inner surface in physical contact with the optical element. Therefore, assembly errors can be reduced.

Figure 39:
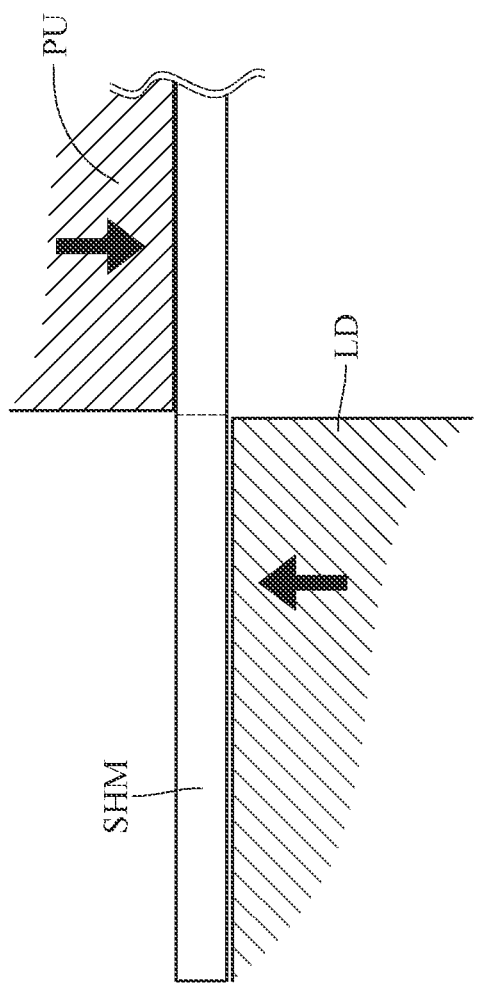
FIG. 39 and FIG. 40 show a ferromagnetic element formed by stamping process.
Figure 40:
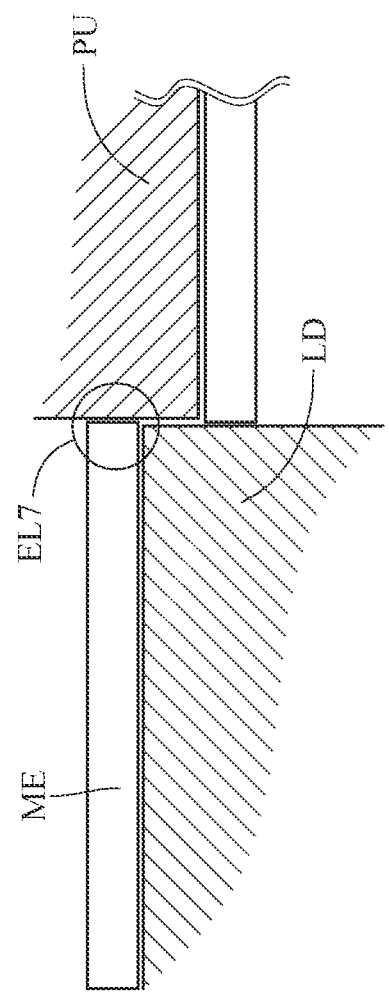
Figure 41:
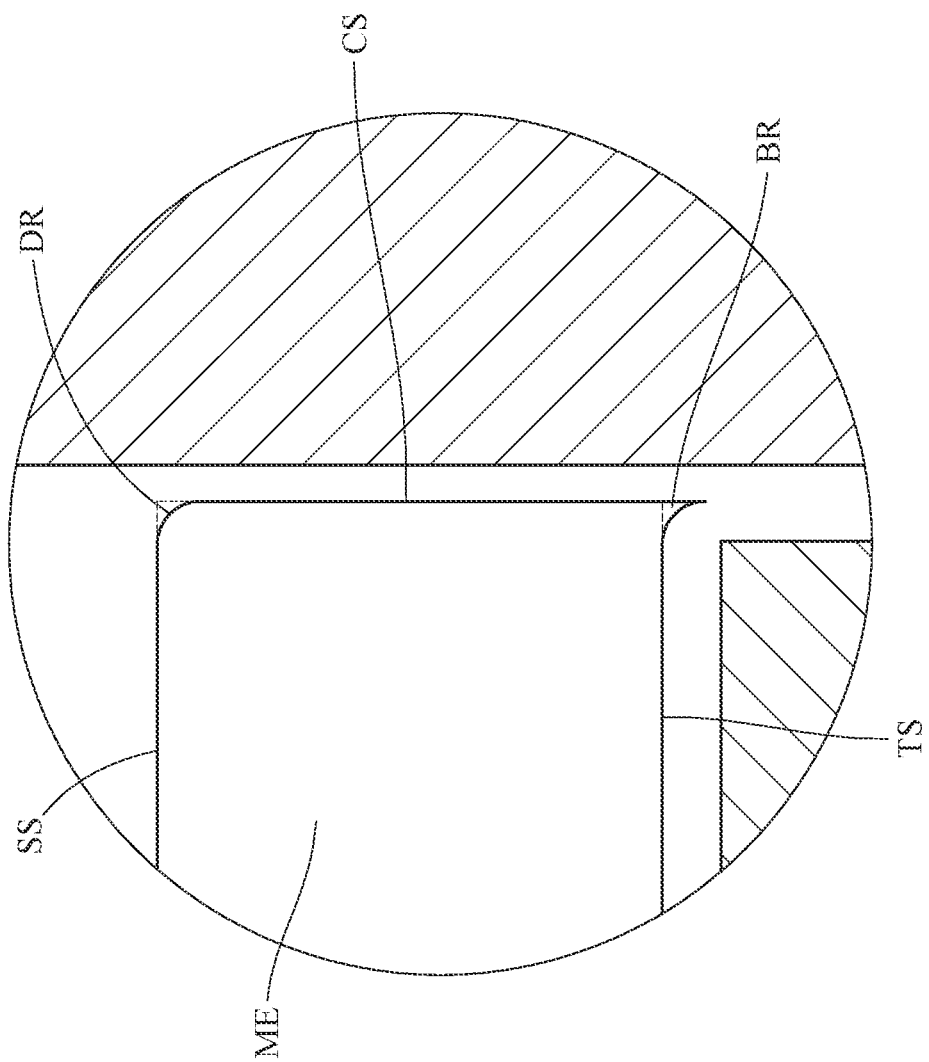
FIG. 41 is an enlarged view of region EL7 in FIG. 40.

The ferromagnetic element can be formed with a shearing surface, a tearing surface and a cutting surface by stamping process. The tearing surface is opposite to the shearing surface, and the cutting surface is connected to the shearing surface and the tearing surface. Moreover, the driving coil is not in physical contact with the tearing surface. In a stamping process, the ferromagnetic element is formed with a shearing surface, a tearing surface opposite to the shearing surface and a cutting surface connected to the shearing surface and the tearing surface. There is a roll-over at the intersection of the shearing surface and the cutting surface formed due to shaping deformation, and there is a burr at the intersection of the tearing surface and the cutting surface formed due to the tear during fracture. Therefore, by the design that the driving coil is arranged not in physical contact with the tearing surface of the first electrical connection part, the risk of the driving coil being cut off by the burr can be prevented. Please refer to FIG. 39 and FIG. 40, which show a ferromagnetic element ME formed by stamping process. As shown in FIG. 39 and FIG. 40, a sheet metal SHM is cut off during a cutting process by a punch PU and a die LD so as to form the ferromagnetic element ME. Please also refer to FIG. 41, which is an enlarged view of region EL7 in FIG. 40. As seen, the ferromagnetic element ME has a roll-over DR formed due to shaping deformation at the intersection of the shearing surface SS and the cutting surface CS, and a burr BR formed due to the tear during fracture at the intersection of the tearing surface TS and the cutting surface CS after the stamping process.

The first electrical connection part of the ferromagnetic element can be disposed on a bar structure of the carrier. The part of the tearing surface located at the first electrical connection part faces the bar structure, and the part of the shearing surface located at the first electrical connection part is in physical contact with the driving coil. Therefore, the tearing surface facing and covering the carrier can prevent the driving coil form being cut off by the burr. Moreover, the driving coil can include two wire ends, and one of the wire ends surrounds the bar structure and is in physical contact with the shearing surface of the first electrical connection part so as to achieve electrical connection. Therefore, when the wire end is fixed on the bar structure, the electrical connection between the driving coil and the ferromagnetic element is also achieved at the same time, thereby reducing assembly steps.

The optical element driving unit can further include a light blocking layer disposed on the ferromagnetic element. Furthermore, at least one part of the ferromagnetic element can be not covered by the carrier, and the light blocking layer is disposed on the part of the ferromagnetic element not covered by the carrier. Therefore, light can be prevented from being reflected by the ferromagnetic element, so that optical properties may not be affected. For instance, in the imaging optical module, light reflected by the ferromagnetic element may cause flare and thus affect image quality. Moreover, the light blocking layer can also work as a damping layer having a damping function. In one configuration, the carrier can have a glue recess at which the exposed part of the ferromagnetic element is located, and the light blocking layer can be a damper disposed in the glue recess, such that the vibration of the carrier in movement can be reduced.

The optical element driving unit can further include an electrical insulating barrier layer disposed on the ferromagnetic element. Furthermore, at least one part of the ferromagnetic element can be not covered by the carrier, and the electrical insulating barrier layer is disposed on the part of the ferromagnetic element not covered by the carrier. Therefore, the exposed part of the ferromagnetic element can be prevented from being accidentally electrically connected to other elements so as to ensure the functionality of the driving unit. Moreover, the electrical insulating barrier layer can also work as a damping layer having a damping function. In one configuration, the electrical insulating barrier layer can also have a light-shielding function so as to prevent non-imaging light from being reflected by the ferromagnetic element into the image sensor and thus reduce flare.

The present disclosure provides an imaging optical module, which includes the aforementioned optical element driving unit and an imaging assembly. The imaging assembly includes the optical element(s) located at the imaging light path.

Figure 42:
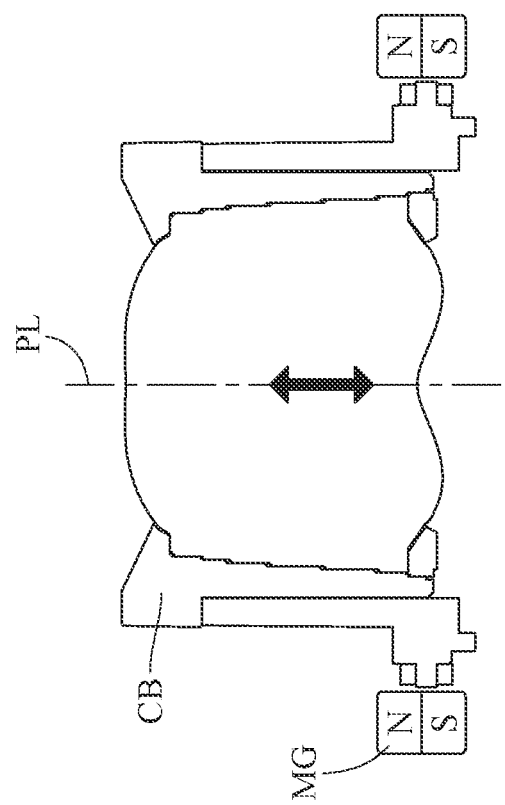
FIG. 42 is a schematic view of one configuration of imaging optical module where magnetic poles of magnets are arranged such that a carrier can be driven to move along an imaging light path.

The carrier can have a degree of freedom of movement along the imaging light path. Therefore, the optical element driving unit can provide the imaging optical module with zooming or focusing functions. In detail, the movement direction of the carrier is determined by the arrangement of the direction of magnetic poles. For example, please refer to FIG. 42, which is a schematic view of one configuration of imaging optical module where magnetic poles of magnets MG are arranged such that a carrier CB can be driven to move along an imaging light path PL. When the direction of magnetic poles is arranged parallel to the imaging light path PL, the carrier CB is movable along the imaging light path PL so as to provide effects of zooming or focusing.

Figure 43:
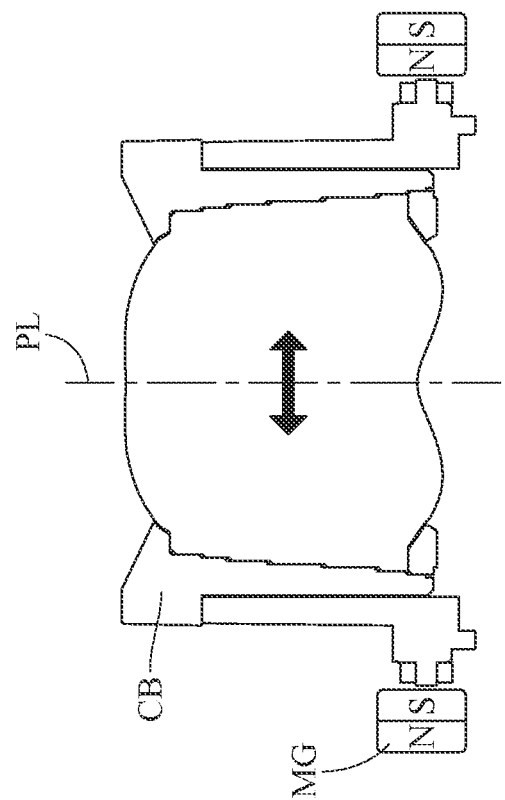
FIG. 43 is a schematic view of one configuration of imaging optical module where magnetic poles of magnets are arranged such that a carrier can be driven to move along a direction perpendicular to an imaging light path.

The carrier can have a degree of freedom of movement in a direction perpendicular to the imaging light path. Therefore, the optical element driving unit can provide the imaging optical module with optical image stabilization or optical axis tilt-shift functions. In detail, the movement direction of the carrier is determined by the arrangement of the direction of magnetic poles. For example, please refer to FIG. 43, which is a schematic view of one configuration of imaging optical module where magnetic poles of magnets MG are arranged such that a carrier CB can be driven to move along a direction perpendicular to an imaging light path PL. When the direction of magnetic poles is arranged perpendicular to the imaging light path PL, the carrier CB is movable in a direction perpendicular to the imaging light path PL so as to provide effects of optical image stabilization or optical axis tilt-shift.

The present disclosure provides an electronic device, which includes the aforementioned imaging optical module and an image sensor. The image sensor is disposed on an image surface of the imaging optical module.

According to the present disclosure, the aforementioned features and conditions can be utilized in numerous combinations so as to achieve corresponding effects.

According to the above description of the present disclosure, the following specific embodiments are provided for further explanation.

1st Embodiment

Figure 2:
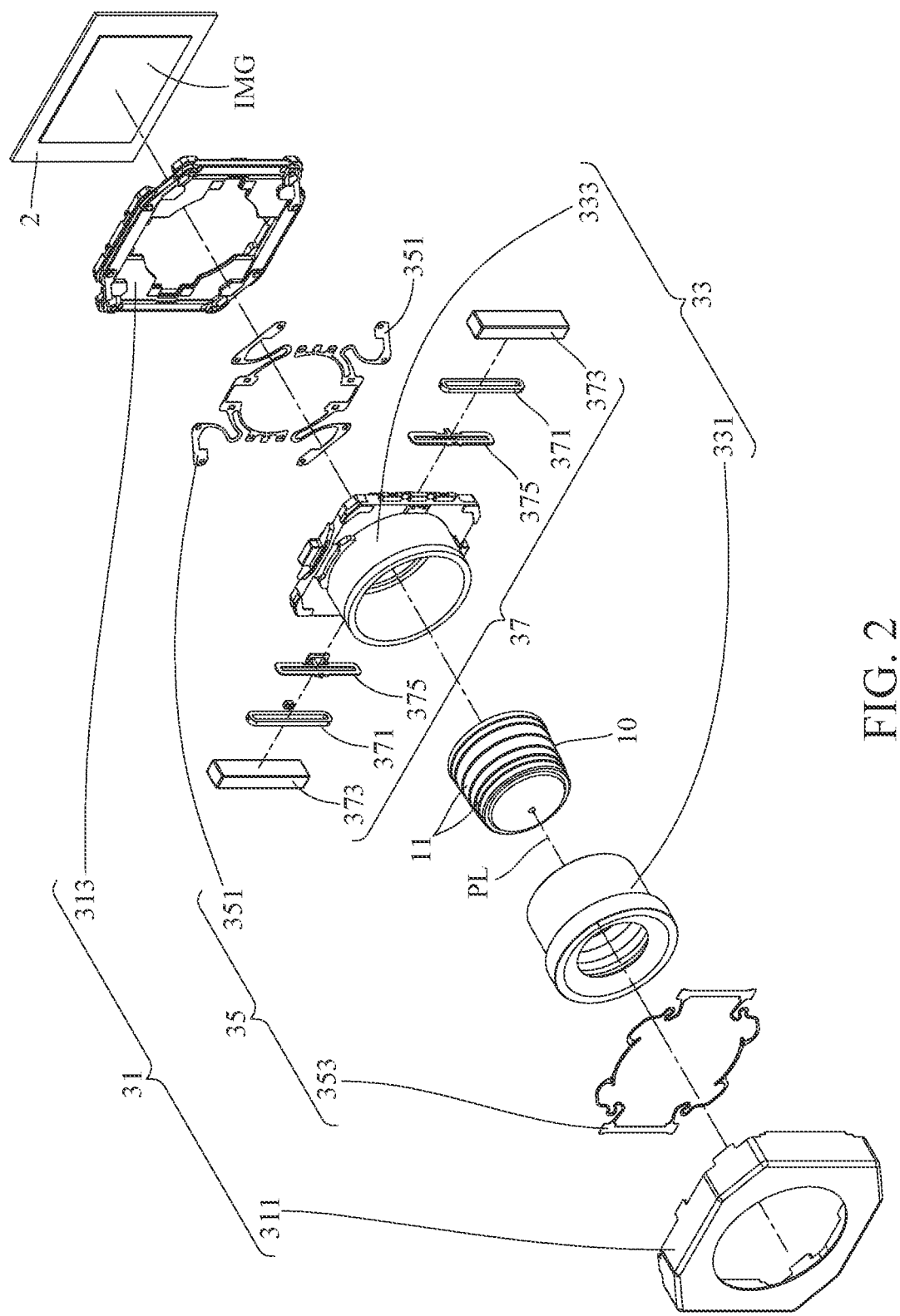
FIG. 2 is an exploded view of the imaging optical module and the image sensor in FIG. 1.
Figure 3:
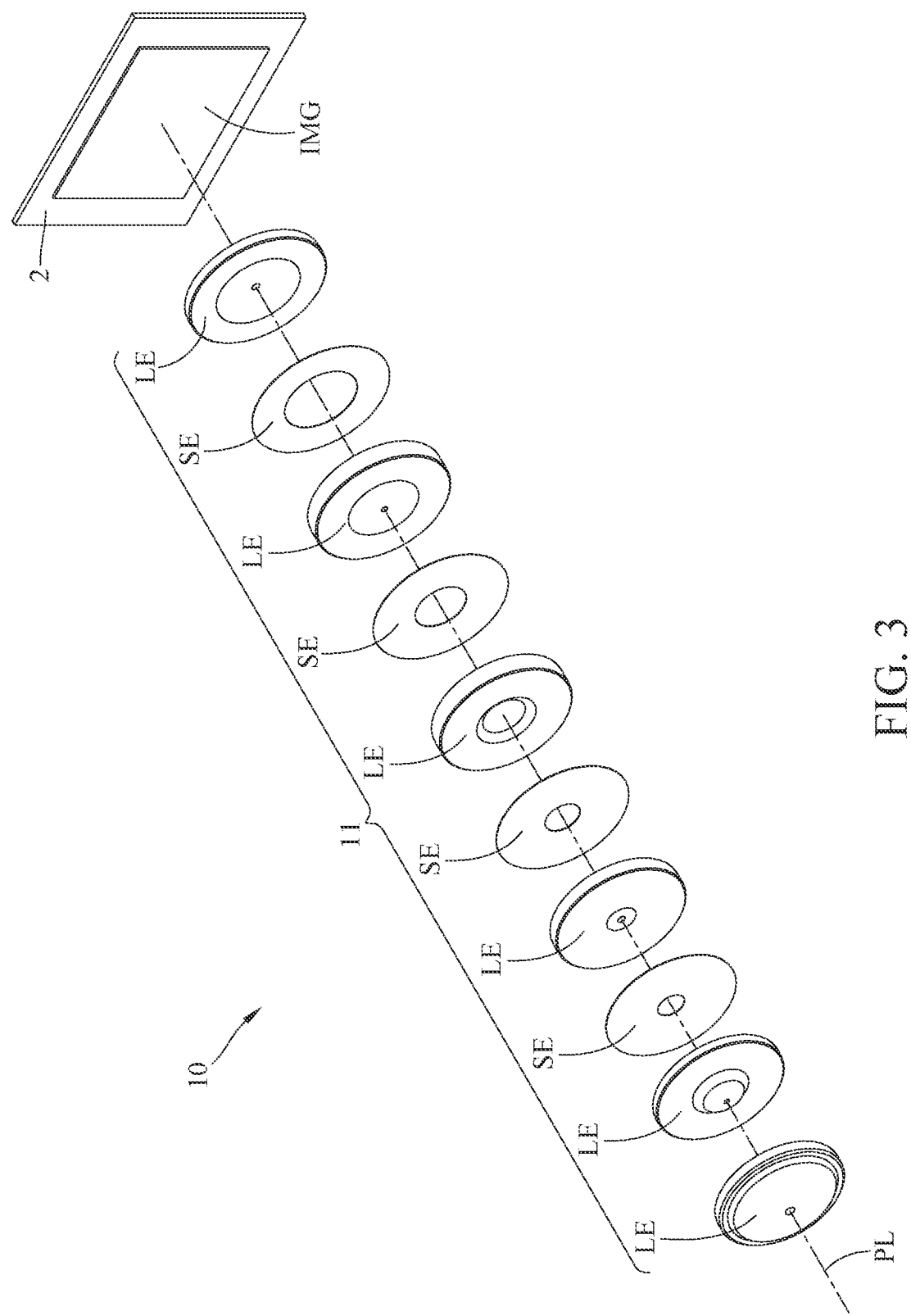
FIG. 3 is an exploded view of an imaging assembly and an image sensor in FIG. 2.
Figure 4:
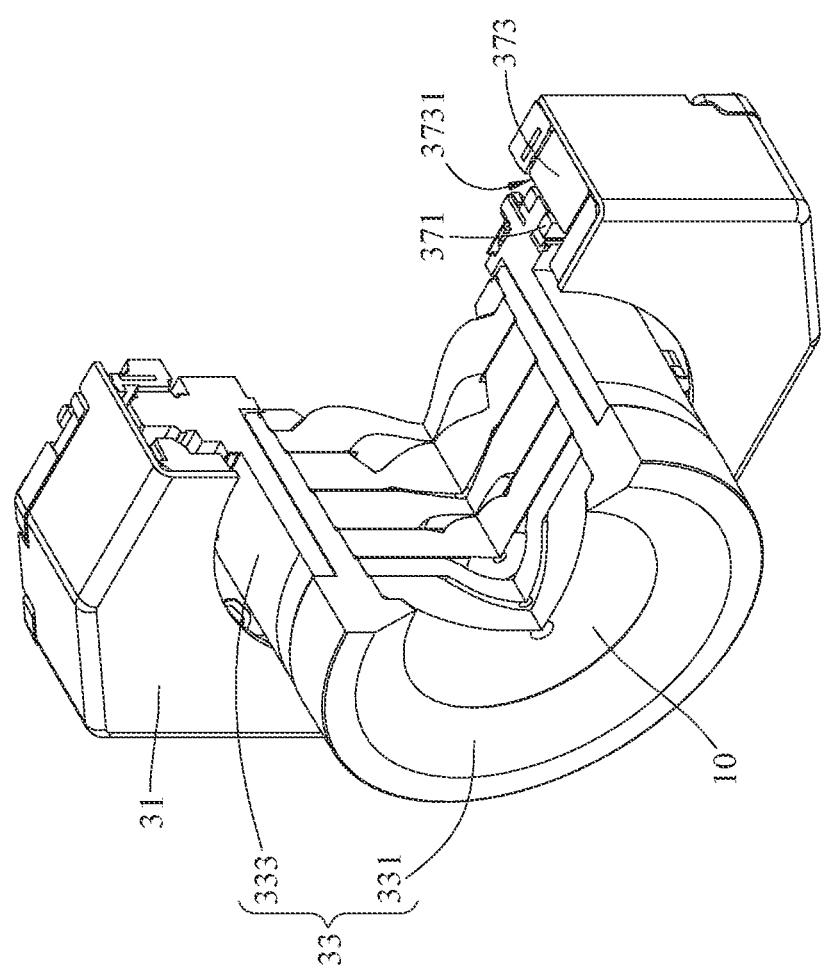
FIG. 4 is a sectional perspective view of the imaging optical module in FIG. 1.
Figure 5:
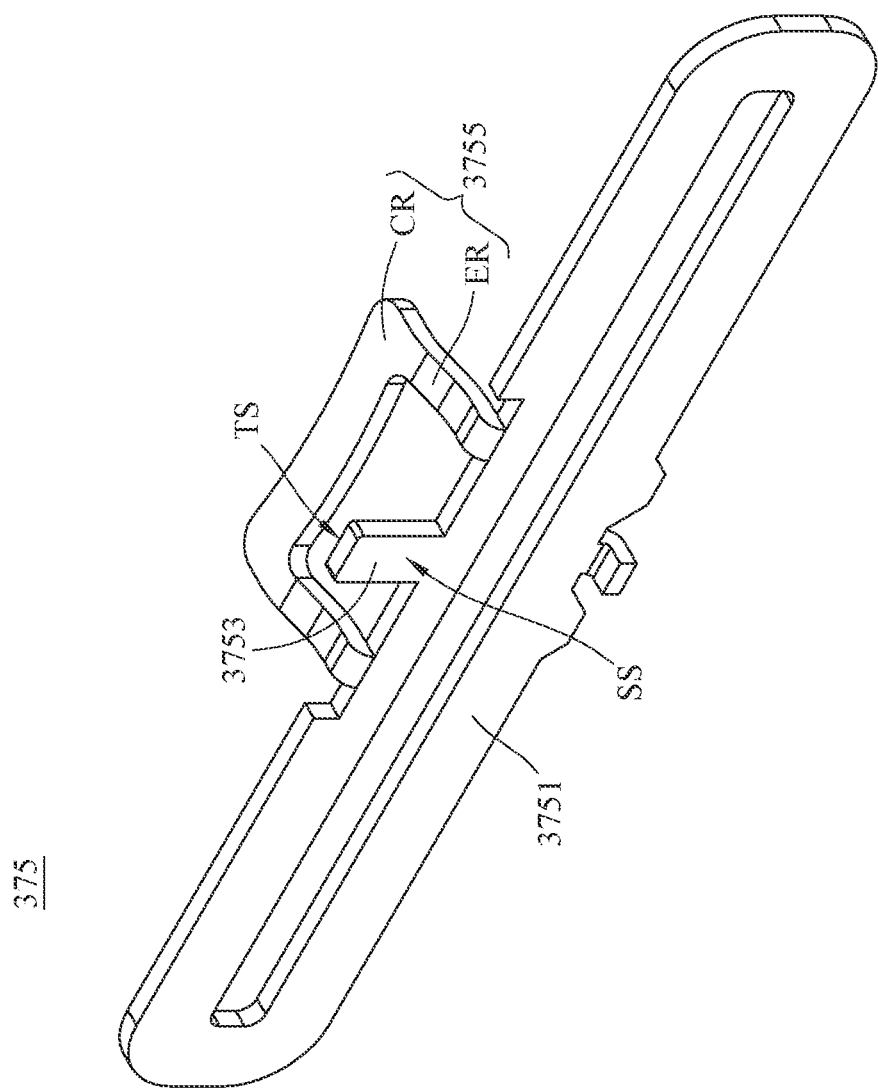
FIG. 5 is a perspective view of one ferromagnetic element in FIG. 2.
Figure 6:
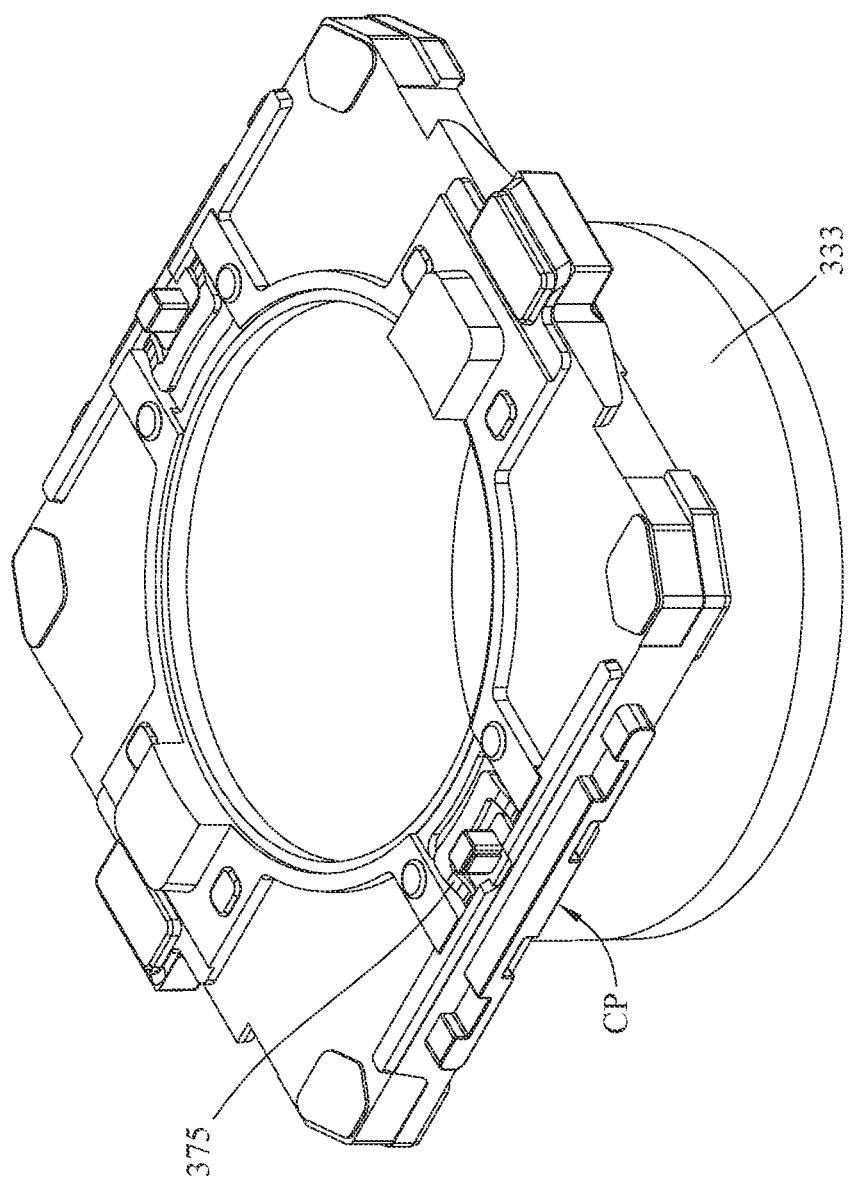
FIG. 6 is a perspective view of ferromagnetic elements and a mounting part in FIG. 2 with the ferromagnetic elements embedded in the mounting part.
Figure 7:
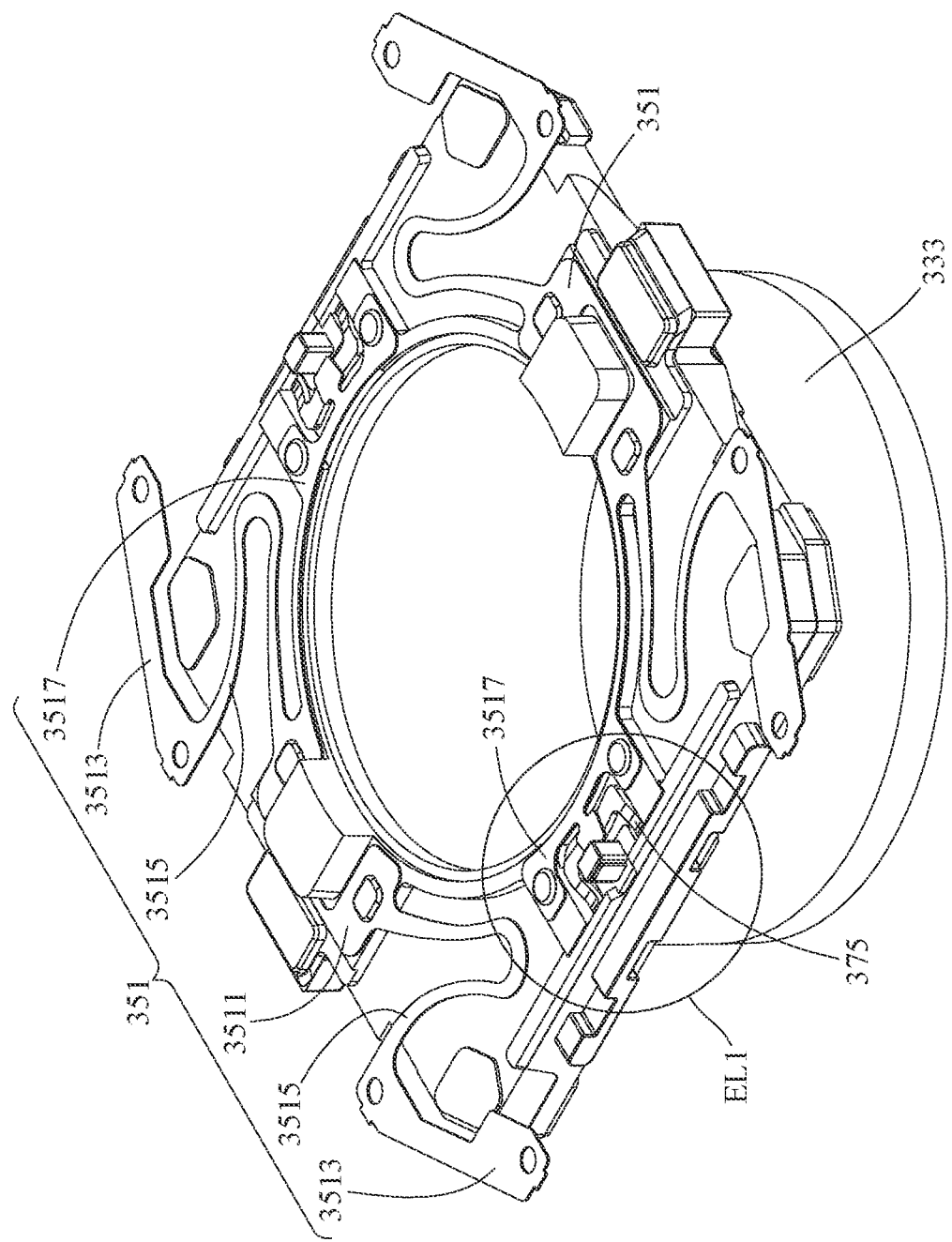
FIG. 7 is a perspective view of first flat springs, the mounting part and the ferromagnetic elements in FIG. 2 with the first flat springs connected to the mounting part and electrically connected to the ferromagnetic elements.
Figure 8:
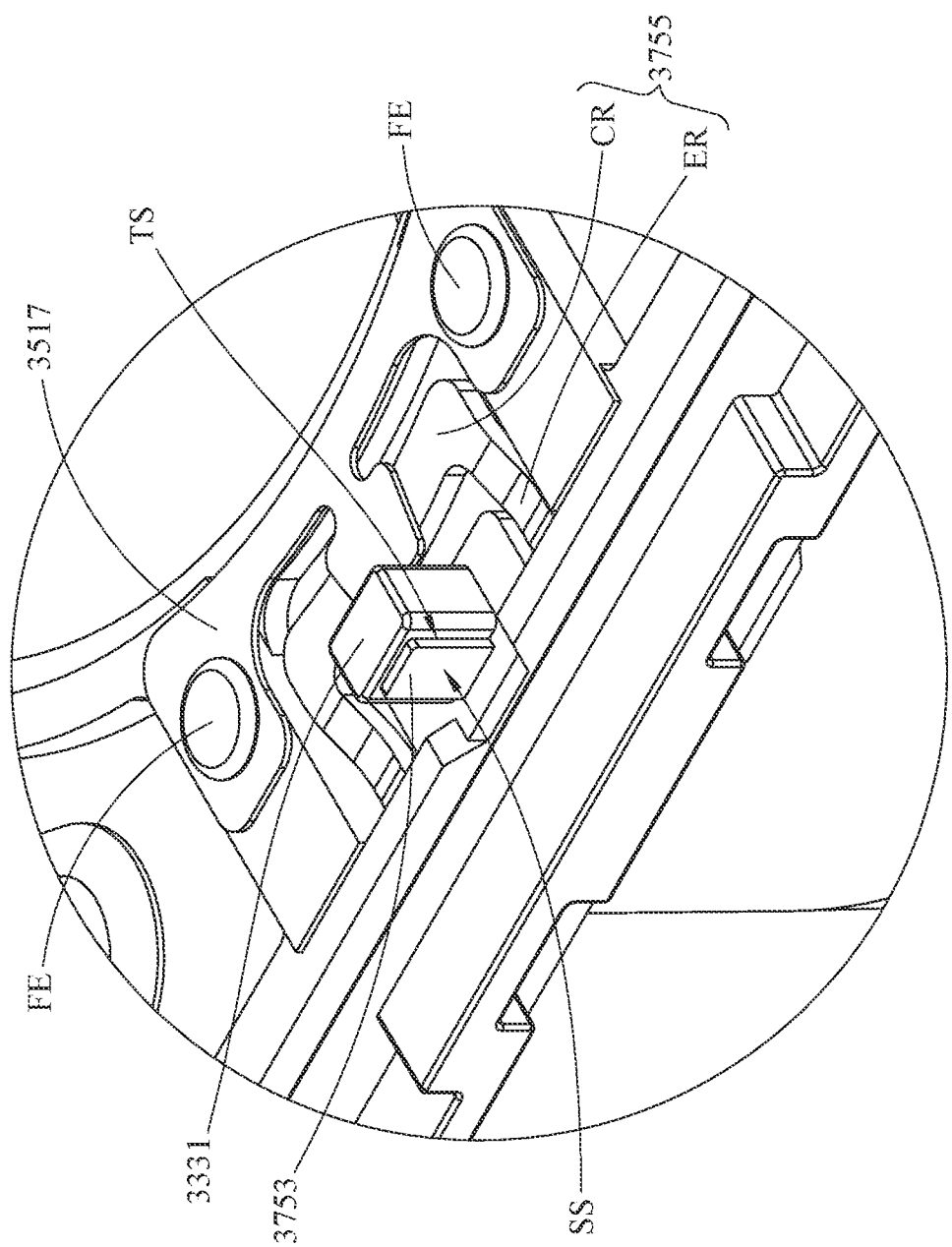
FIG. 8 is an enlarged view of region EU in FIG. 7.
Figure 9:
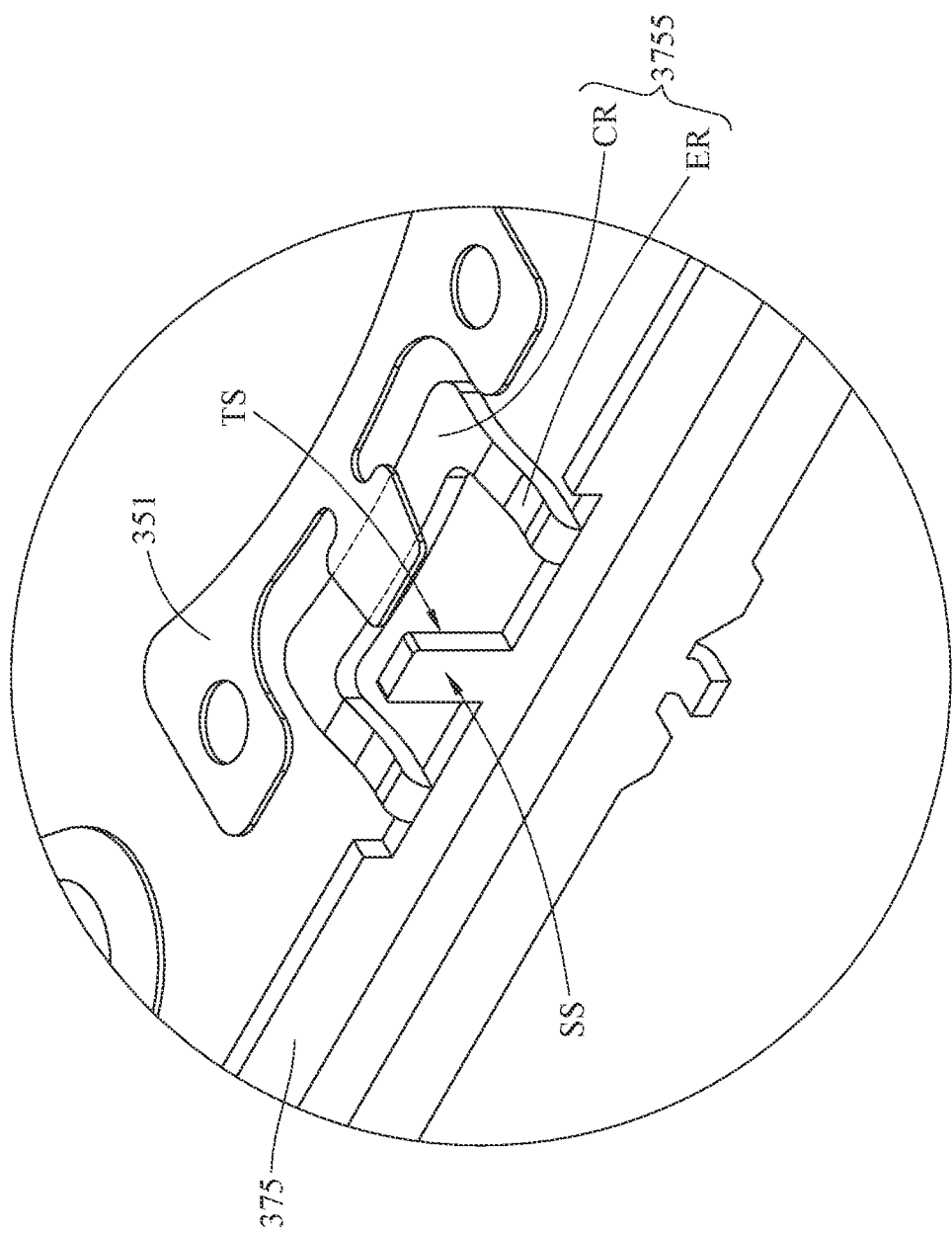
FIG. 9 is an enlarged view of the first flat spring and the ferromagnetic element in region EU of FIG. 7.
Figure 10:
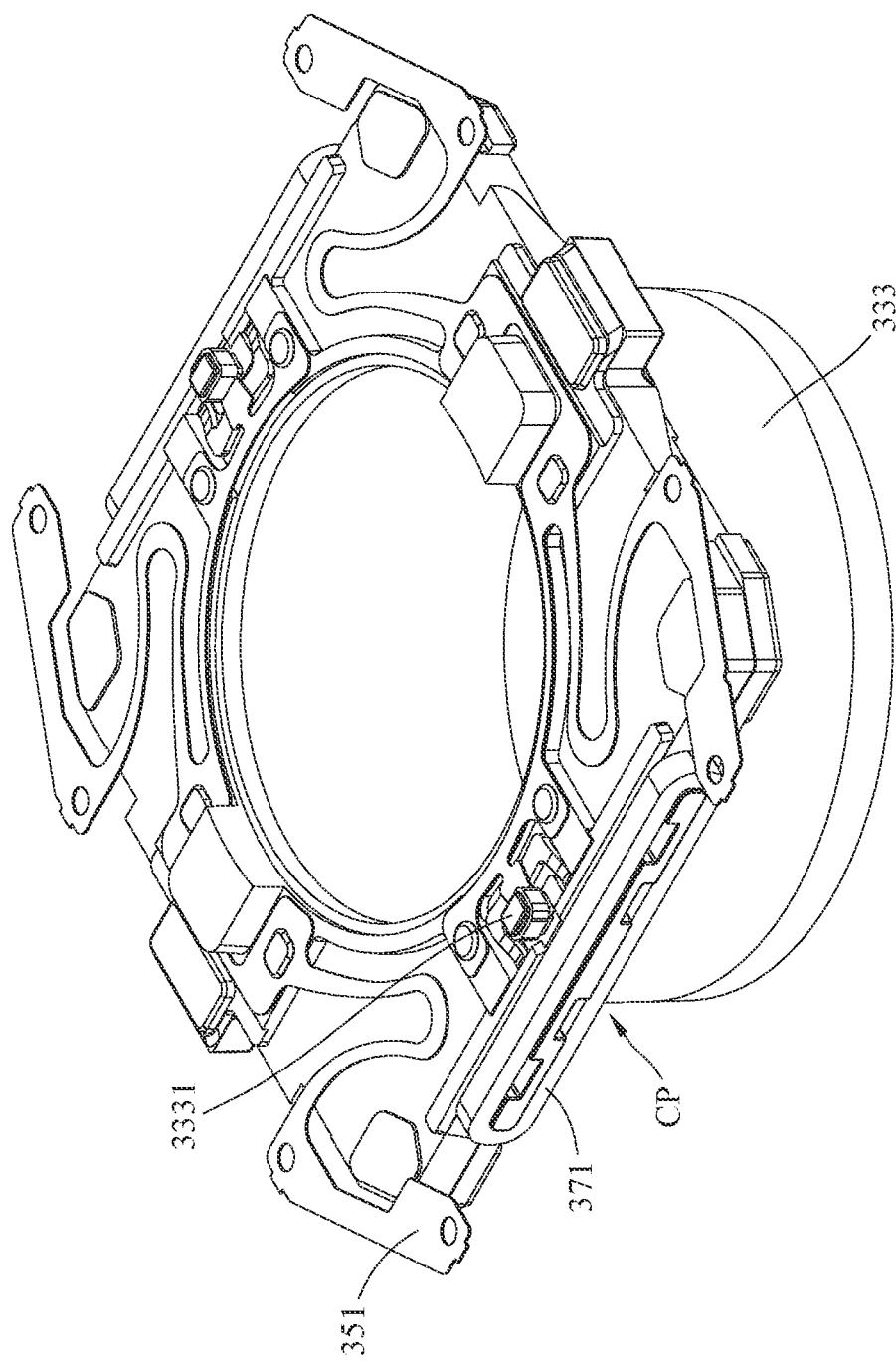
FIG. 10 is a perspective view of driving coils, the first flat springs, the mounting part and the ferromagnetic elements in FIG. 2 with the driving coils and the first flat springs disposed on the mounting part and electrically connected to the ferromagnetic elements.
Figure 11:
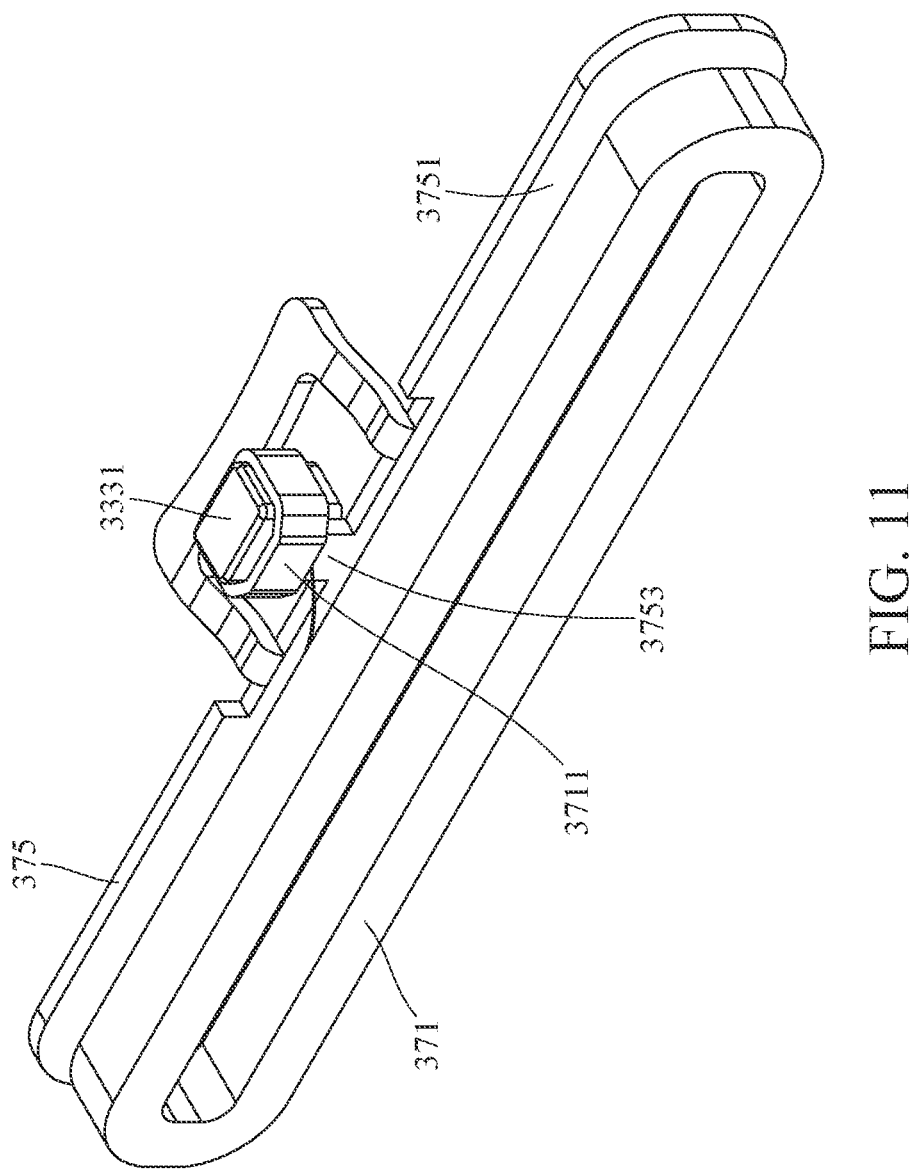
FIG. 11 shows the connection of one set of the driving coils, bar structures and the ferromagnetic elements in FIG. 10.

Please refer to FIG. 1 to FIG. 11. FIG. 1 is perspective view of an imaging optical module and an image sensor according to the 1st embodiment of the present disclosure, FIG. 2 is an exploded view of the imaging optical module and the image sensor in FIG. 1, FIG. 3 is an exploded view of an imaging assembly and an image sensor in FIG. 2, FIG. 4 is a sectional perspective view of the imaging optical module in FIG. 1, FIG. 5 is a perspective view of one ferromagnetic element in FIG. 2, FIG. 6 is a perspective view of ferromagnetic elements and a mounting part in FIG. 2 with the ferromagnetic elements embedded in the mounting part, FIG. 7 is a perspective view of first flat springs, the mounting part and the ferromagnetic elements in FIG. 2 with the first flat springs connected to the mounting part and electrically connected to the ferromagnetic elements, FIG. 8 is an enlarged view of region EL1 in FIG. 7, FIG. 9 is an enlarged view of the first flat spring and the ferromagnetic element in region EL1 of FIG. 7, FIG. 10 is a perspective view of driving coils, the first flat springs, the mounting part and the ferromagnetic elements in FIG. 2 with the driving coils and the first flat springs disposed on the mounting part and electrically connected to the ferromagnetic elements, and FIG. 11 shows the connection of one set of the driving coils, bar structures and the ferromagnetic elements in FIG. 10.

The imaging optical module 1 includes an imaging assembly 10 and an optical element driving unit 30. The imaging assembly 10 includes a plurality of optical elements 11. Furthermore, an image sensor 2 is disposed on an image surface IMG of the imaging optical module 1. As shown in FIG. 3, the optical elements 11 include a plurality of lens elements LE and a plurality of light-shielding elements SE arranged along an imaging light path PL.

The optical element driving unit 30 includes a stationary body 31, a carrier 33, a supporting mechanism 35 and an electromagnetic driving assembly 37. The stationary body 31 includes a casing 311 and a base 313, and the casing 311 is disposed on the base 313. The casing 311 and the base 313 together form a space for the carrier 33, the supporting mechanism 35 and the electromagnetic driving assembly 37 to be disposed therein.

The carrier 33 includes a barrel part 331 and a mounting part 333. The barrel part 331 is disposed on the mounting part 333, and the optical elements 11 are disposed in the barrel part 331. In this embodiment, the optical elements 11 can be disposed on the barrel part 331 in advance, and the set of the optical elements 11 and the barrel part 331 is disposed on the mounting part 333 so as to improve manufacturing process.

The supporting mechanism 35 includes two first flat springs 351 and a second flat spring 353. The first flat springs 351 are electrically conductive and connected to the mounting part 333 and the base 313. The second flat spring 353 is connected to the mounting part 333 and the casing 311, so that the supporting mechanism 35 provides the carrier 33 with at least one degree of freedom of movement relative to the stationary body 31. Each of the first flat springs 351 includes a carrier-connecting part 3511, two stationary-body-connecting parts 3513 and two elastic arm parts 3515. The carrier-connecting part 3511 is connected to the mounting part 333 of the carrier 33. The stationary-body-connecting parts 3513 are connected to the base 313 of the stationary body 31, and the elastic arm parts 3515 are connected to respective stationary-body-connecting parts 3513 and the carrier-connecting part 3511.

The electromagnetic driving assembly 37 is configured to move the carrier 33 relative to the stationary body 31, and the electromagnetic driving assembly 37 includes two driving coils 371, two driving magnets 373 and two ferromagnetic elements 375 respectively disposed on opposite sides of the mounting part 333. The two driving coils 371 are formed by the same wire.

As shown in FIG. 2, FIG. 4, FIG. 6 and FIG. 10, the driving coils 371 are disposed at coil mounting positions CP of the mounting part 333 of the carrier 33, and the driving magnets 373 are disposed on the stationary body 31 and corresponding to respective driving coils 371.

The ferromagnetic elements 375 are coupled to the mounting part 333 of the carrier 33 by, for example, injection molding process or hot riveting process, such that the ferromagnetic elements 375 are embedded in the mounting part 333 of the carrier 33 and thus together with the carrier 33 have the at least one degree of freedom of movement relative to the stationary body 31. As shown in FIG. 5, each of the ferromagnetic elements 375 is one-piece formed and includes a magnetic field guiding part 3751, a first electrical connection part 3753 and a second electrical connection part 3755.

The magnetic field guiding part 3751 faces the driving coil 371 and the driving magnet 373. In detail, as shown in FIG. 2 and FIG. 4, each of the driving magnets 373 has a corresponsive surface 3731, which faces both the magnetic field guiding part 3751 of the ferromagnetic element 375 and the driving coil 371, and the magnetic field guiding part 3751 is located farther away from the corresponsive surface 3731 of the driving magnet 373 than the driving coil 371 to the corresponsive surface 3731 of the driving magnet 373. Therefore, the magnetic field distribution of the driving magnets 373 can be properly guided so as to increase the magnetic flux through the driving coils 371.

The first electrical connection part 3753 is disposed on a bar structure 3331 of the mounting part 333 and exposed on the surface of the mounting part 333, and the first electrical connection part 3753 is electrically connected to the driving coil 371. In specific, as shown in FIG. 11, each of the driving coils 371 includes a wire end 3711, and the wire end 3711 is coiled around the bar structure 3331 of the mounting part 333 and in physical contact with the first electrical connection part 3753 so as to achieve electrical connection. Therefore, when the wire end 3711 is fixed on the bar structure 3331, the electrical connection between the driving coil 371 and the ferromagnetic element 375 is also achieved at the same time, thereby reducing assembly steps. In this embodiment, the magnetic field guiding part 3751 faces the driving coil 371 and the driving magnet 373, and the first electrical connection part 3753 is electrically connected to the driving coil 371. Therefore, the ferromagnetic elements 375 have both functions of magnetic field guidance and circuit connection, so that the number of components of the optical element driving unit 30 can be minimized so as to increase manufacturing efficiency.

The second electrical connection part 3755 is electrically connected to the first flat spring 351, and the first flat spring 351 and the driving coil 371 are electrically connected in series via the second electrical connection part 3755 and the first electrical connection part 3753. Therefore, the driving coils 371 and the first flat springs 351 can be prevented from direct contact with each other, which may affect the flatness of the first flat spring 351, so as to increase assembly yield; furthermore, the arrangements of the first flat springs 351 and the driving coils 371 in a limited space can be improved while satisfying the requirement of electrical connections of the flat spring and the driving coil, so that the design flexibility can be increased. In detail, as shown in FIG. 7 to FIG. 9, each of the first flat springs 351 further includes a ferromagnetic-element-connecting part 3517 extending from the carrier-connecting part 3511, and each of the second electrical connection parts 3755 includes a contact portion CR and an elastic portion ER. The ferromagnetic-element-connecting part 3517 is fixed to fixing points FE of the mounting part 333 by hot riveting process, and simultaneously presses and bends the second electrical connection part 3755, such that the second electrical connection part 3755 forms the contact portion CR and the elastic portion ER. Therefore, the contact portion CR is in physical contact with the first flat spring 351, and the elastic portion ER is connected to the contact portion CR and constantly exerts an elastic force on the contact portion CR towards the first flat spring 351. Therefore, the electrical connection between the ferromagnetic element 375 and the first flat spring 351 can be achieved and the warpage of flat spring occurring during a welding process can be prevented so as to increase assembly yield rate. In this embodiment, the ferromagnetic element 375 is formed with a shearing surface, a tearing surface and a cutting surface, and the shearing surface, the tearing surface and the cutting surface of the ferromagnetic element 375 are formed due to stamping process. The details can be referred to foregoing descriptions corresponding to FIG. 39 to FIG. 41, and the details in this regard will not be provided again. Additionally, the tearing surface TS of the first electrical connection part 3753 faces and covers the bar structure 3331, and the driving coil 371 is in physical contact with the shearing surface SS but not the tearing surface TS of the first electrical connection part 3753, so that the risk of the driving coil 371 being cut off by the burr BR at the intersection of the tearing surface TS and the cutting surface CS can be prevented.

In this embodiment, the direction of magnetic poles of the driving magnets 373 may be arranged according to actual functionality requirements. As such, the carrier 33 may have a degree of freedom of movement along the imaging light path PL, so that the imaging optical module 1 is provided with zooming and focusing functions; alternatively, the carrier 33 may have a degree of freedom of movement in a direction perpendicular to the imaging light path PL, so that the imaging optical module 1 is provided with optical image stabilization or optical axis tilt-shift functions. The arrangement can be similar to the arrangement as set forth in the foregoing descriptions corresponding to FIG. 42 and FIG. 43.

2nd Embodiment

Figure 12:
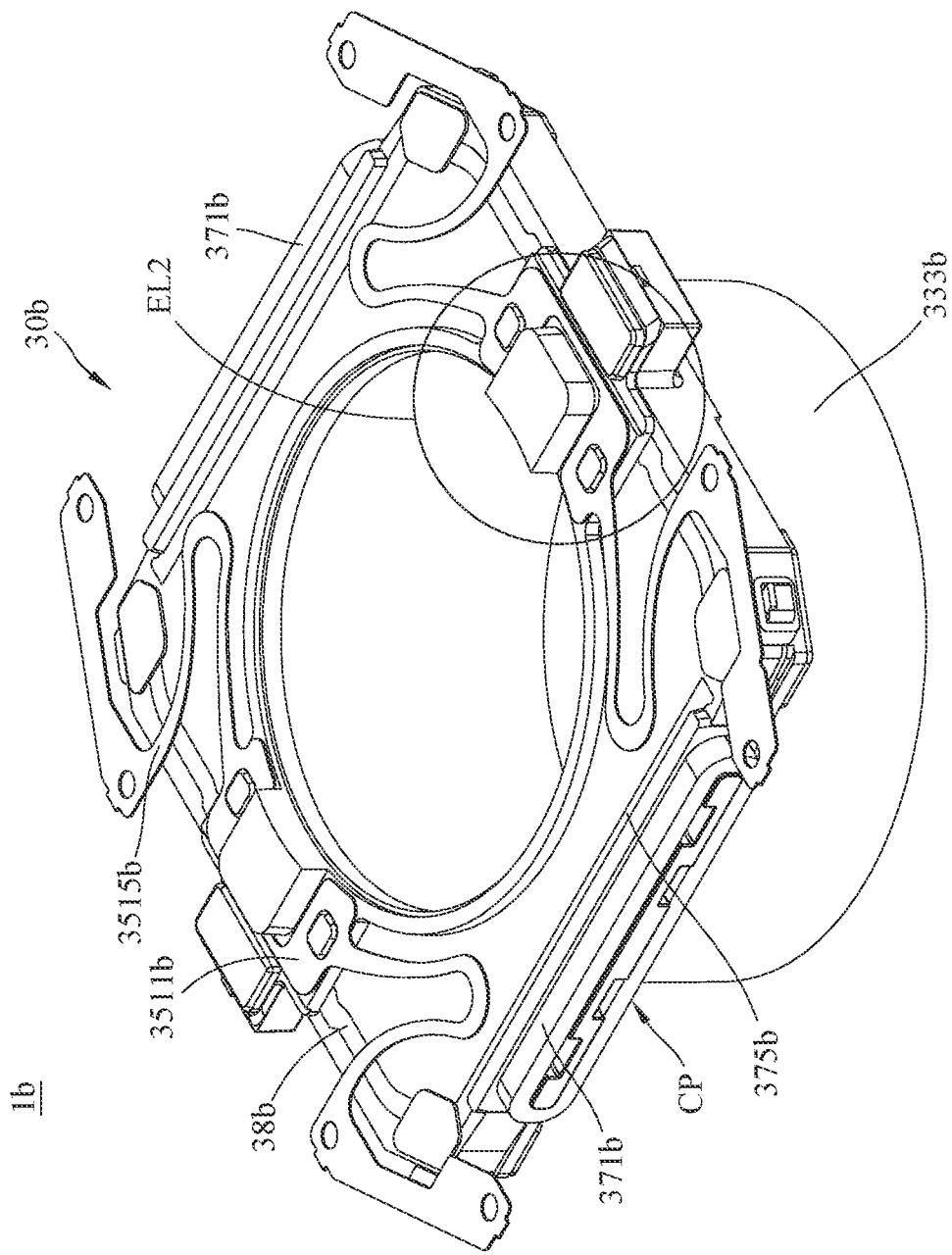
FIG. 12 is perspective view of a mounting part, driving coils, first flat springs and ferromagnetic elements of an imaging optical module according to the 2nd embodiment of the present disclosure.
Figure 13:
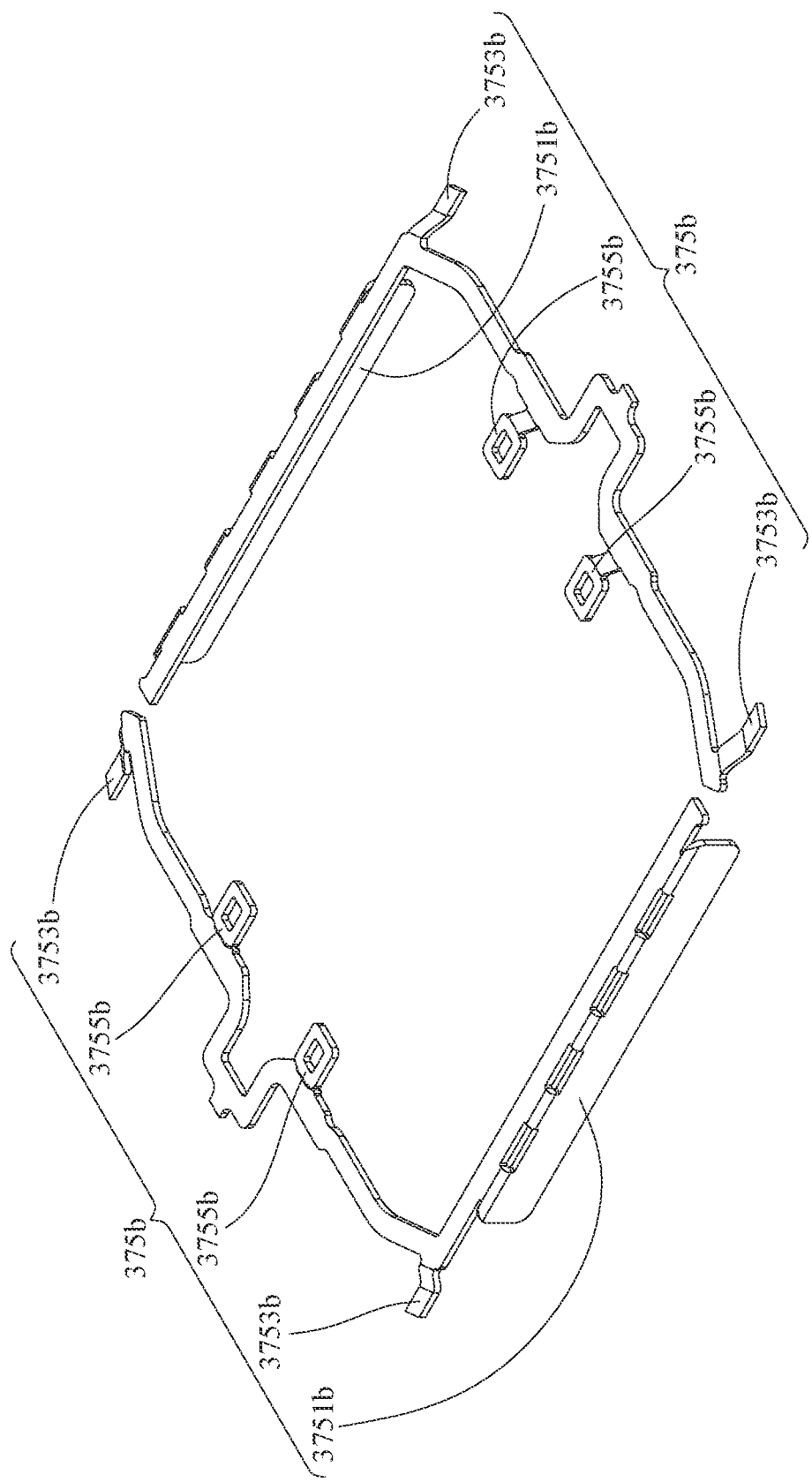
FIG. 13 is a perspective view of the ferromagnetic elements in FIG. 12.
Figure 14:
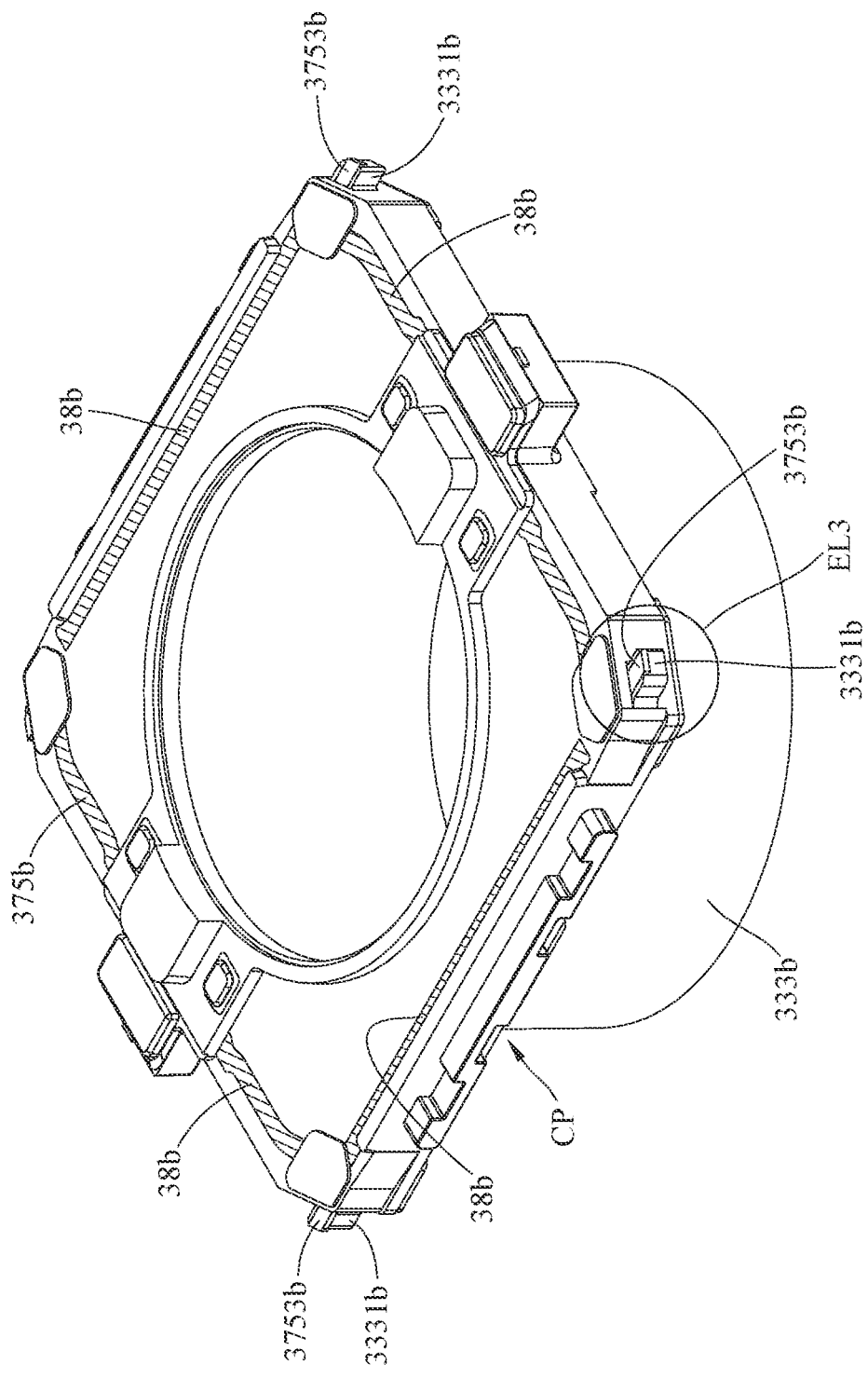
FIG. 14 is a perspective view of the ferromagnetic elements and the mounting part in FIG. 12.
Figure 15:
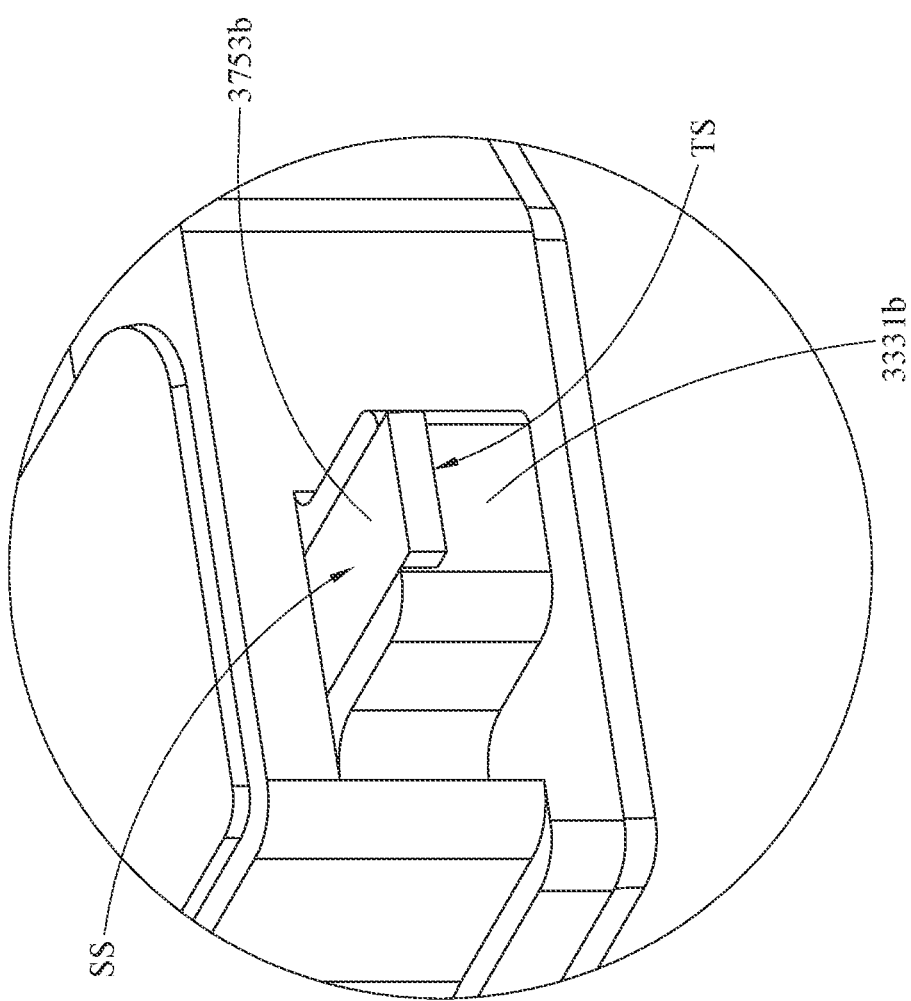
FIG. 15 is an enlarged view of region EL3 in FIG. 14.
Figure 16:
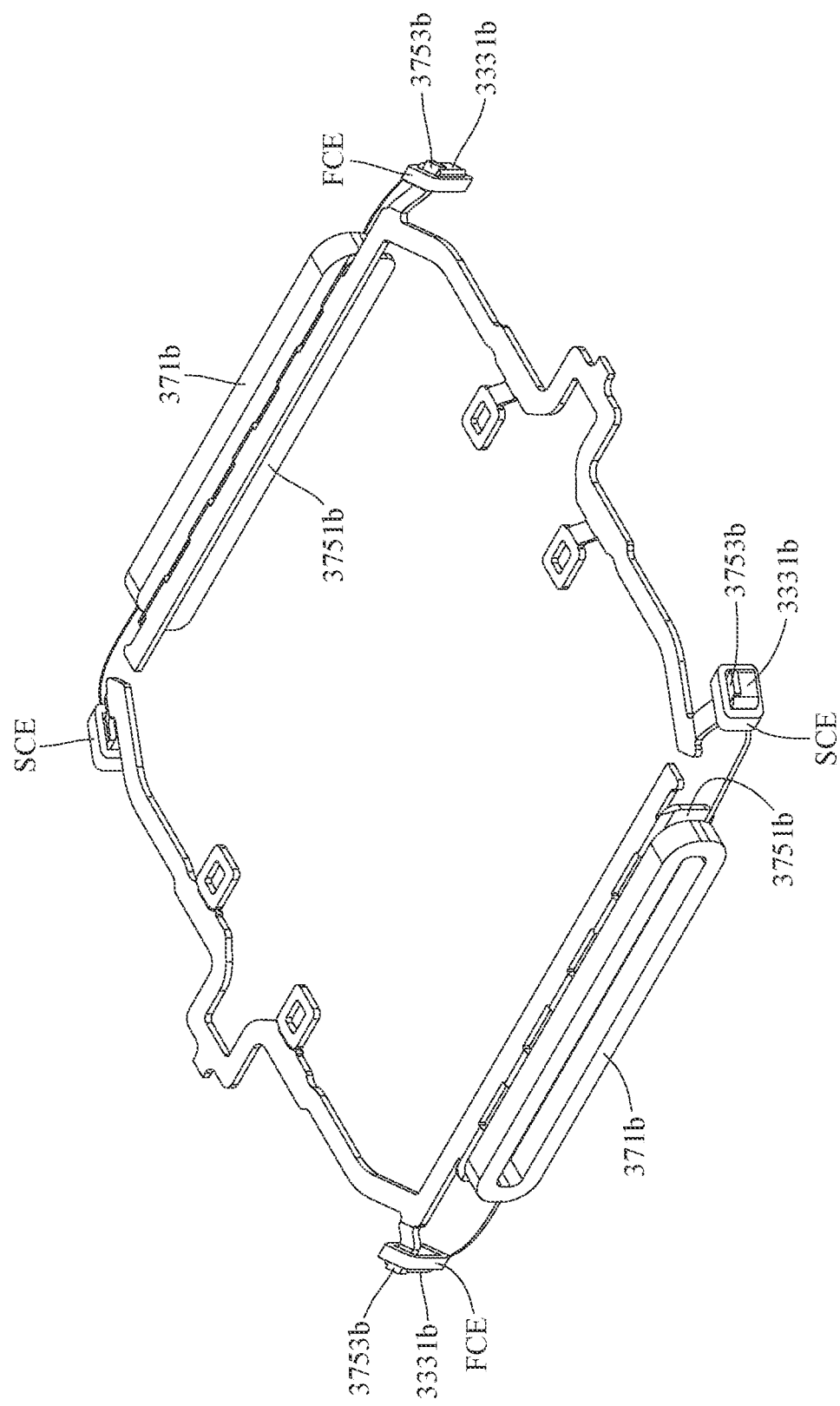
FIG. 16 shows the connections of the driving coils, bar structures and the ferromagnetic elements in FIG. 12.
Figure 17:
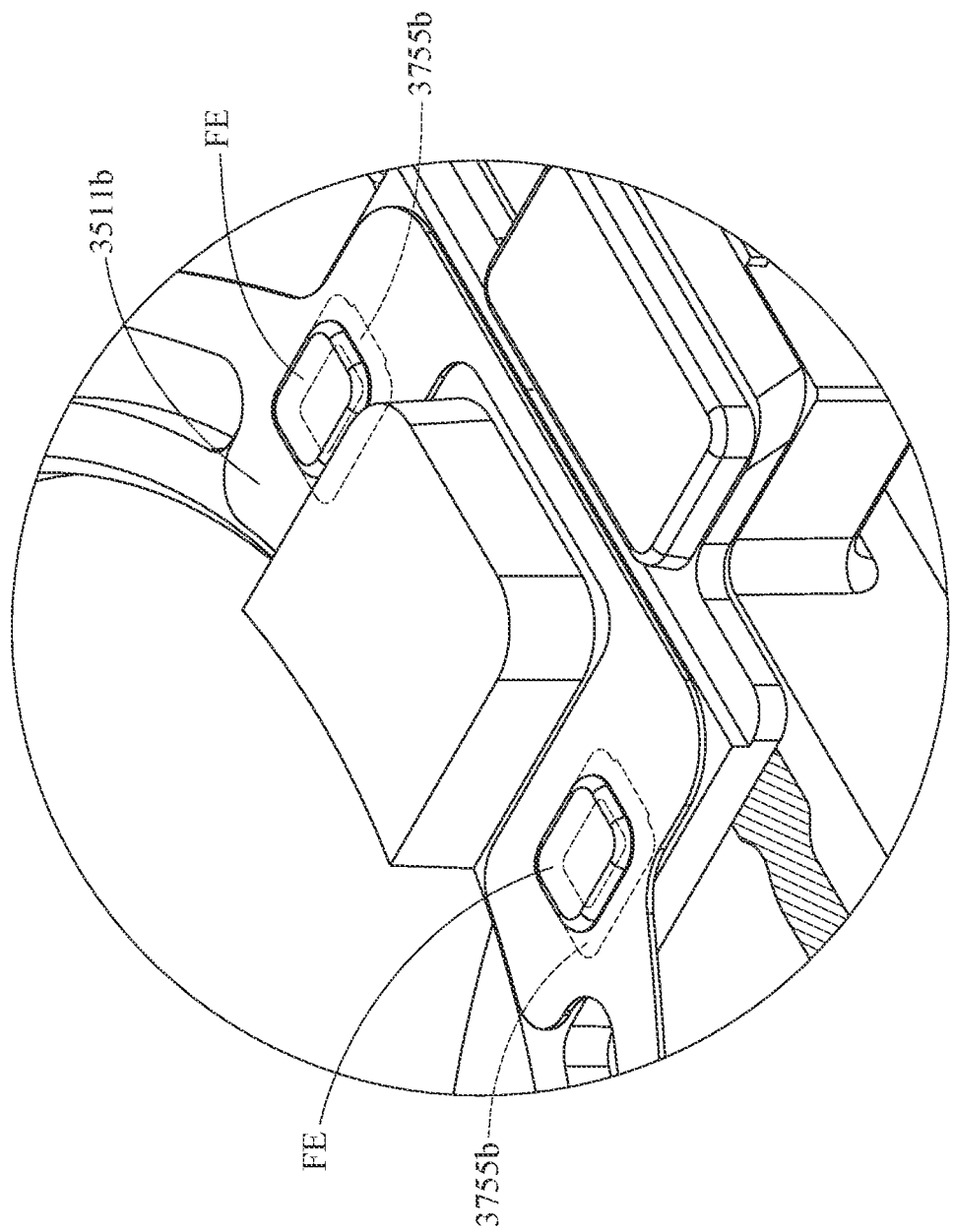
FIG. 17 is an enlarged view of region EL2 in FIG. 12.
Figure 18:
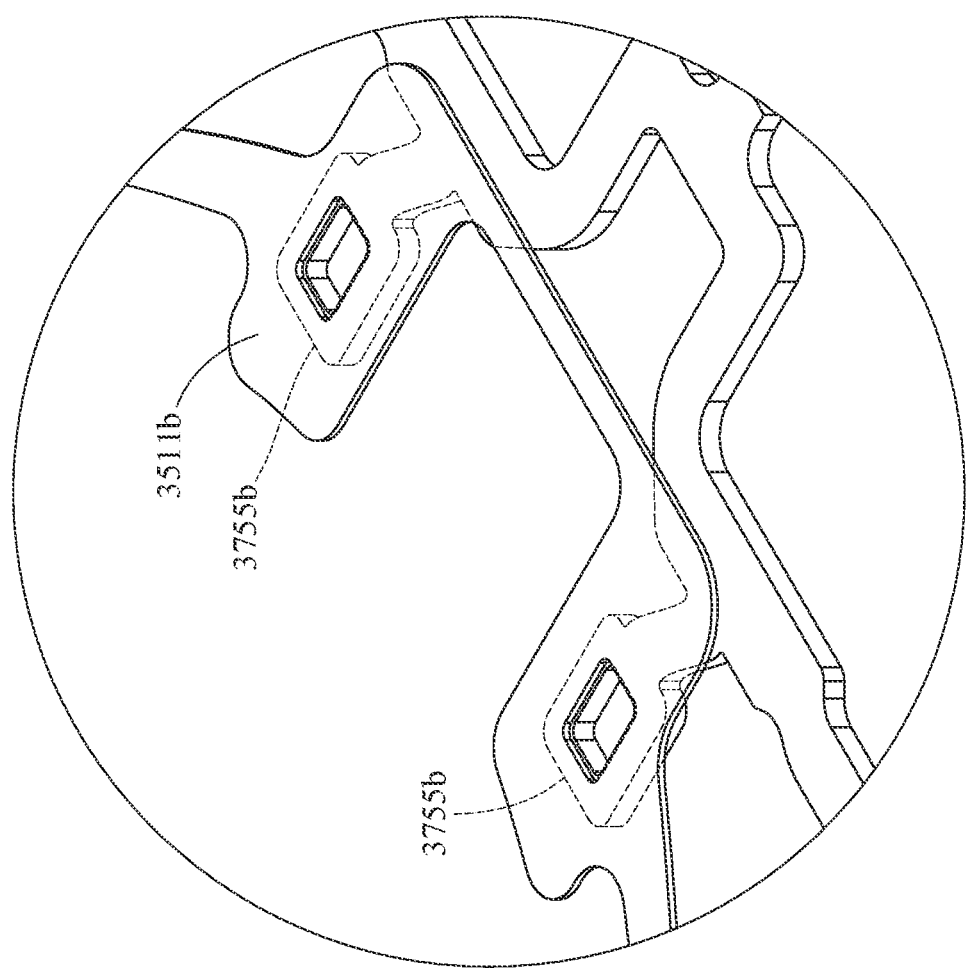
FIG. 18 is an enlarged view of the first flat spring and the ferromagnetic element in region EL2 of FIG. 12.

Please refer to FIG. 12 to FIG. 18. FIG. 12 is perspective view of an mounting part, driving coils, first flat springs and ferromagnetic elements of an imaging optical module according to the 2nd embodiment of the present disclosure, FIG. 13 is a perspective view of the ferromagnetic elements in FIG. 12, FIG. 14 is a perspective view of the ferromagnetic elements and the mounting part in FIG. 12, FIG. 15 is an enlarged view of region EL3 in FIG. 14, FIG. 16 shows the connections of the driving coils, bar structures and the ferromagnetic elements in FIG. 12, FIG. 17 is an enlarged view of region EL2 in FIG. 12, and FIG. 18 is an enlarged view of the first flat spring and the ferromagnetic element in region EL2 of FIG. 12.

In this embodiment, an imaging optical module 1b is provided. The imaging optical module 1b has a configuration similar to that of the imaging optical module 1 as disclosed in the 1st embodiment, and they are different from each other in that the structural features of the driving coil, first flat spring and ferromagnetic element disposed on the mounting part in this embodiment are different from that in the 1st embodiment. Said imaging optical modules of the two embodiments having similar configurations with each other refers to that except for the mounting part, driving coil, first flat spring and ferromagnetic element, elements of one of the imaging optical modules have structural features, for example, the same as that of the other of the imaging optical modules, and the details in this regard will not be provided again.

In specific, in this embodiment, each of ferromagnetic elements 375b is one-piece formed and includes a magnetic field guiding part 3751b, two first electrical connection parts 3753b and two second electrical connection parts 3755b. The magnetic field guiding part 3751b and the first electrical connection parts 3753b are located on two adjacent sides of a mounting part 333b, and the second electrical connection parts 3755b are located between the first electrical connection parts 3753b. In addition, the first electrical connection parts 3753b are respectively disposed on four bar structures 3331 located at four corners of the mounting part 333b and the first electrical connection parts 3753b are exposed on the surface of the mounting part 333b. Moreover, the tearing surface TS of the first electrical connection part 3753b faces and covers the bar structure 3331b.

Two driving coils 371b are respectively disposed at two coil mounting positions CP located at opposite sides of the mounting part 333b and corresponding to respective magnetic field guiding parts 3751b. Each of the driving coils 371b includes a first wire end FCE and a second wire end SCE. The first wire end FCE is coiled around one of the bar structures 3331b of the mounting part 333b and in physical contact with the shearing surface SS of one of the first electrical connection parts 3753b of one of the ferromagnetic elements 375b. The, second wire end SCE is coiled around another of the bar structures 3331b of the mounting part 333b and in physical contact with the shearing surface SS of one of the first electrical connection parts 3753b of the other of the ferromagnetic elements 375b. Additionally, the driving coil 371b is in physical contact with the shearing surface SS but not the tearing surface TS of the first electrical connection part 3753b, so that the risk of the driving coil 371b being cut off by the burr BR at the intersection of the tearing surface TS and the cutting surface CS can be prevented.

Furthermore, in this embodiment, first flat springs 351b are electrically connected to the second electrical connection parts 3755b of the ferromagnetic elements 375b via carrier-connecting parts 3511b thereof, and the first flat springs 351b do not have the structure of ferromagnetic-element-connecting part as described in the 1st embodiment. In detail, as shown in FIG. 12, FIG. 17 and FIG. 18, the carrier-connecting part 3511b presses the second electrical connection part 3755b at fixing points FE of the mounting part 333b via hot riveting process, such that the ferromagnetic element 375b is electrically connected to the first flat spring 351b.

Moreover, in this embodiment, an optical element driving unit 30b further includes an electrical insulating barrier layer 38b. At least one part of the ferromagnetic element 375b is not covered by the mounting part 333b of a carrier 33b, and the part of the ferromagnetic element 375b not covered by the mounting part 333b is exposed on the surface of the mounting part 333b facing the base. In addition, the electrical insulating barrier layer 38b is disposed on the part of the ferromagnetic element 375b not covered by the mounting part 333b. Therefore, the elastic arm parts 3515b of the first flat spring 351b can be prevented from being accidentally electrically connected to the ferromagnetic element 375b when deformation of the elastic arm parts 3515b occurs so as to ensure the functionality of the driving unit. Moreover, the electrical insulating barrier layer 38b also has a light-shielding function so as to prevent non-imaging light from reflected by the ferromagnetic element 375b into the image sensor and thus reduce flare.

3rd Embodiment

Figure 19:
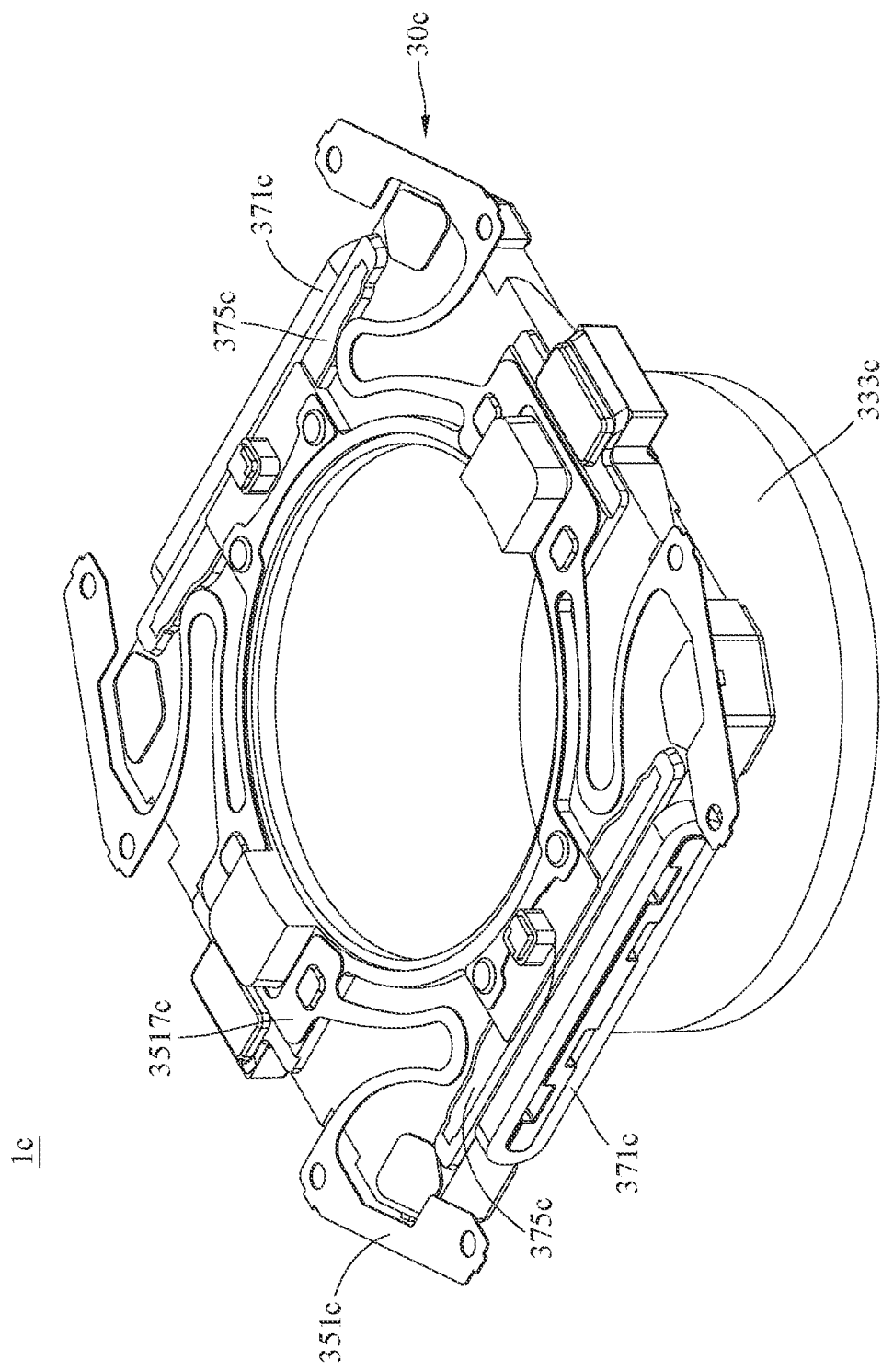
FIG. 19 is perspective view of a mounting part, driving coils, first flat springs and ferromagnetic elements of an imaging optical module according to the 3rd embodiment of the present disclosure.
Figure 20:
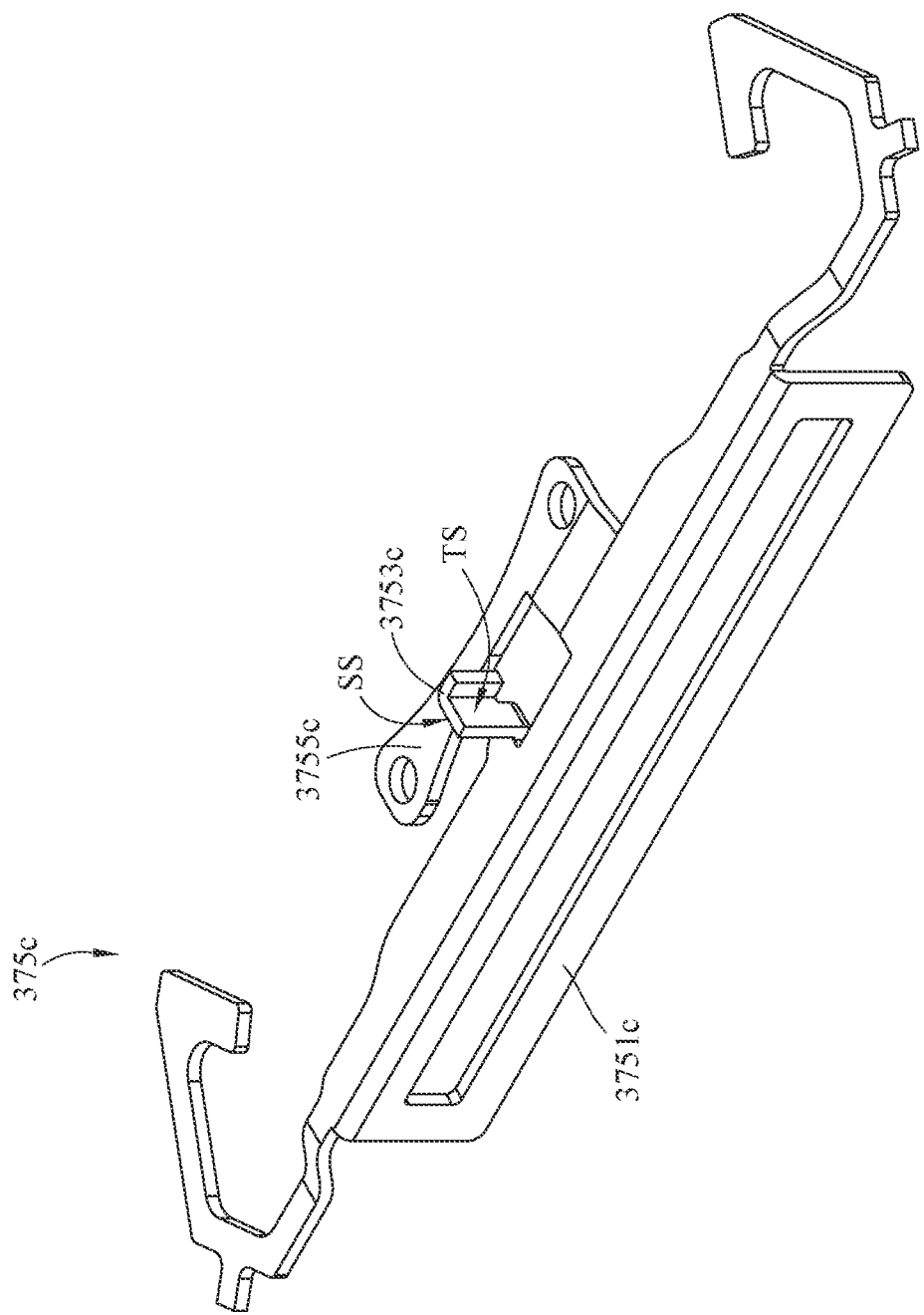
FIG. 20 is a perspective view of one of the ferromagnetic elements in FIG. 19.
Figure 21:
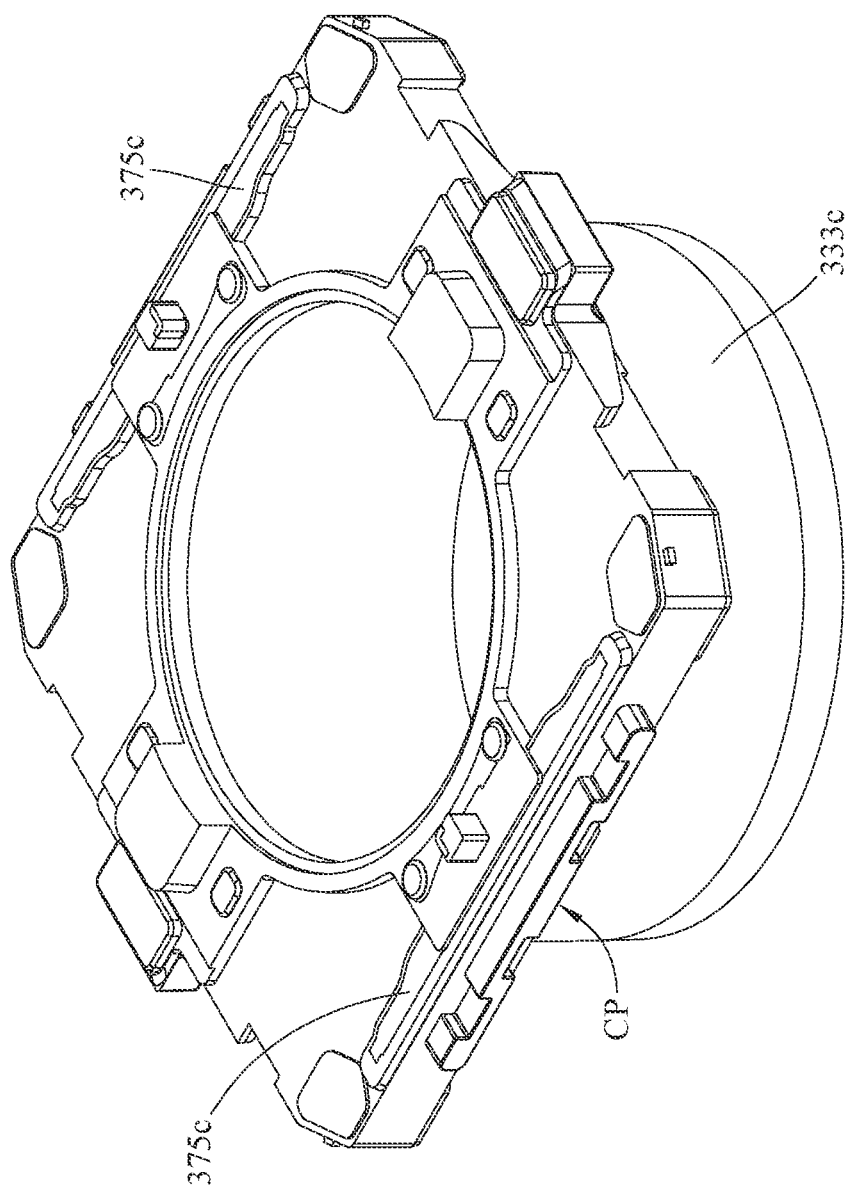
FIG. 21 is a perspective view of the ferromagnetic elements and the mounting part in FIG. 19.
Figure 22:
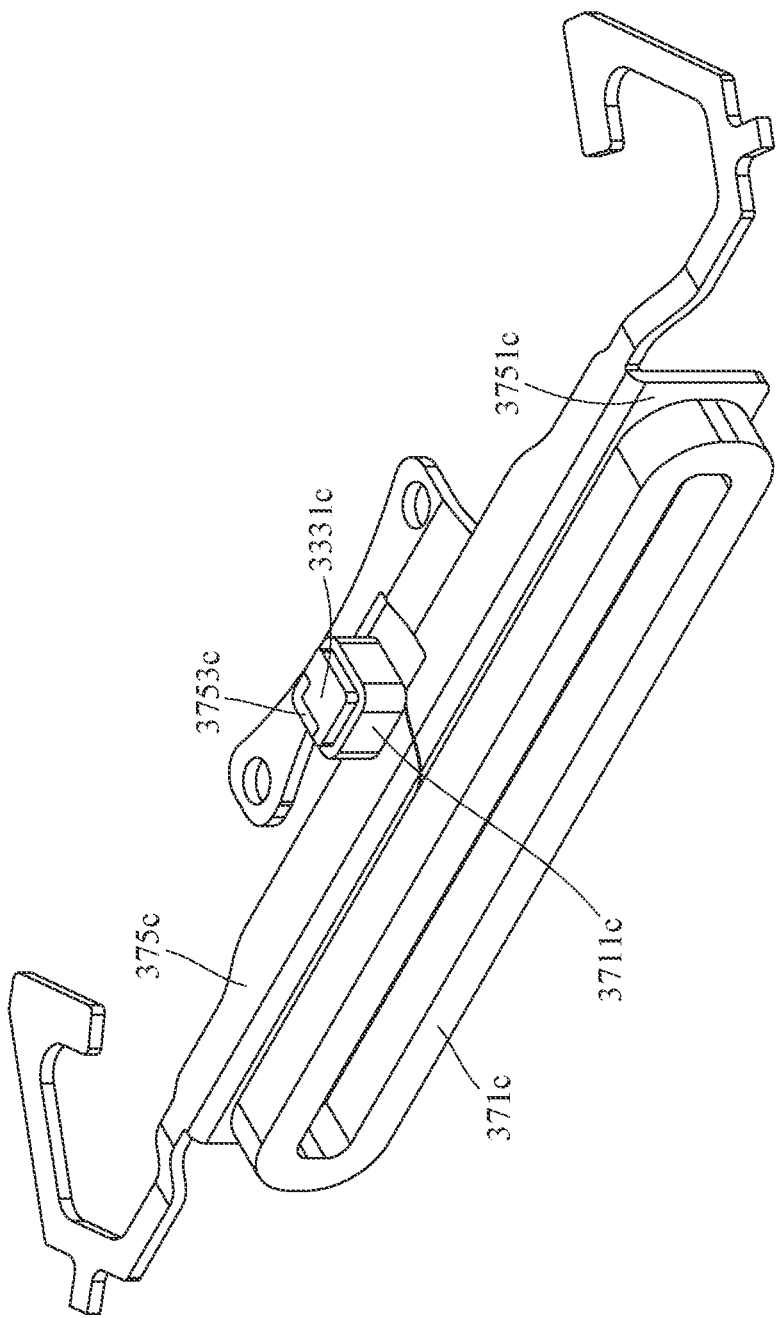
FIG. 22 shows the connection of one set of the driving coils, bar structures and the ferromagnetic elements in FIG. 19.
Figure 23:
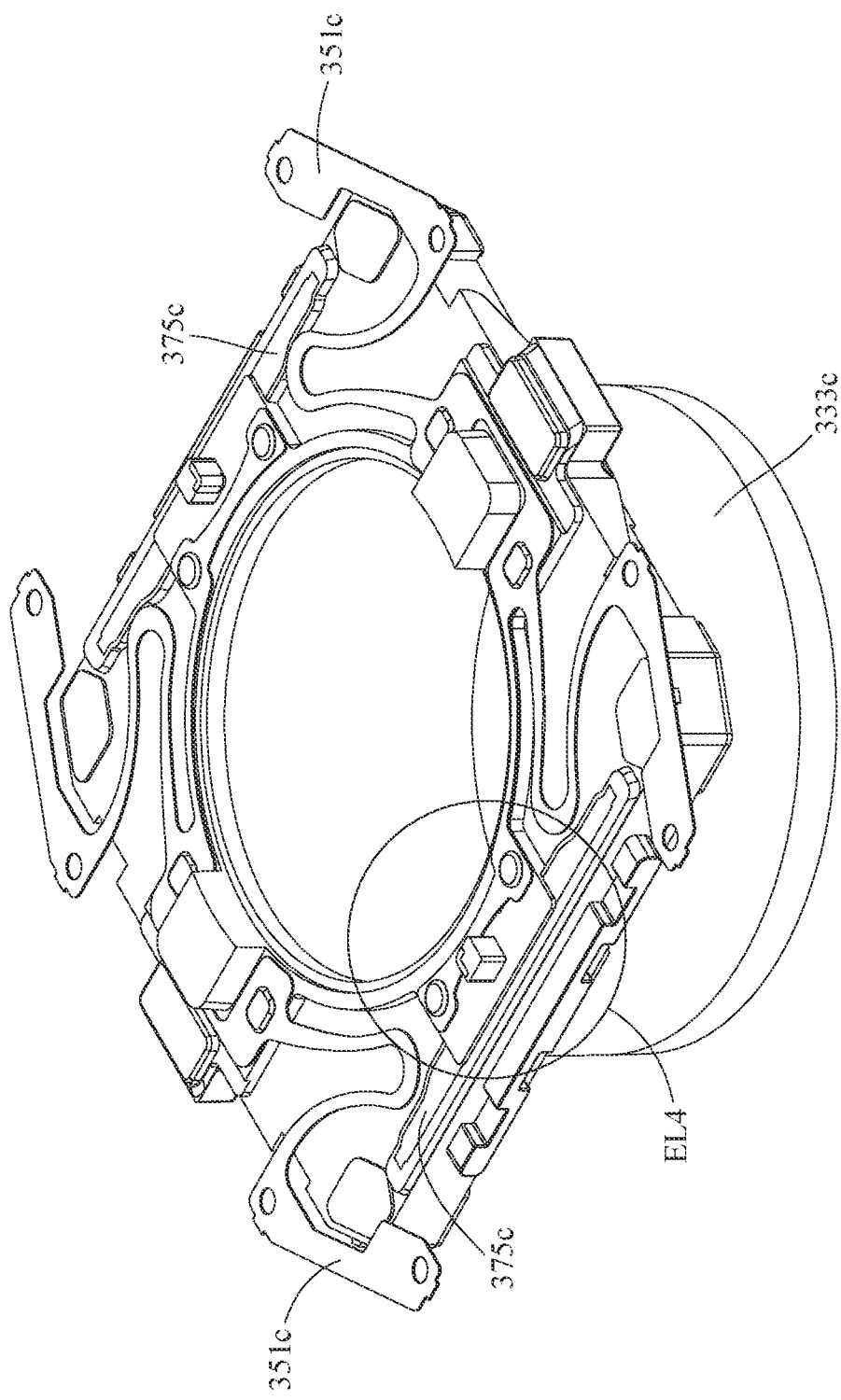
FIG. 23 is a perspective view of the mounting part, the first flat springs and the ferromagnetic elements in FIG. 19.
Figure 24:
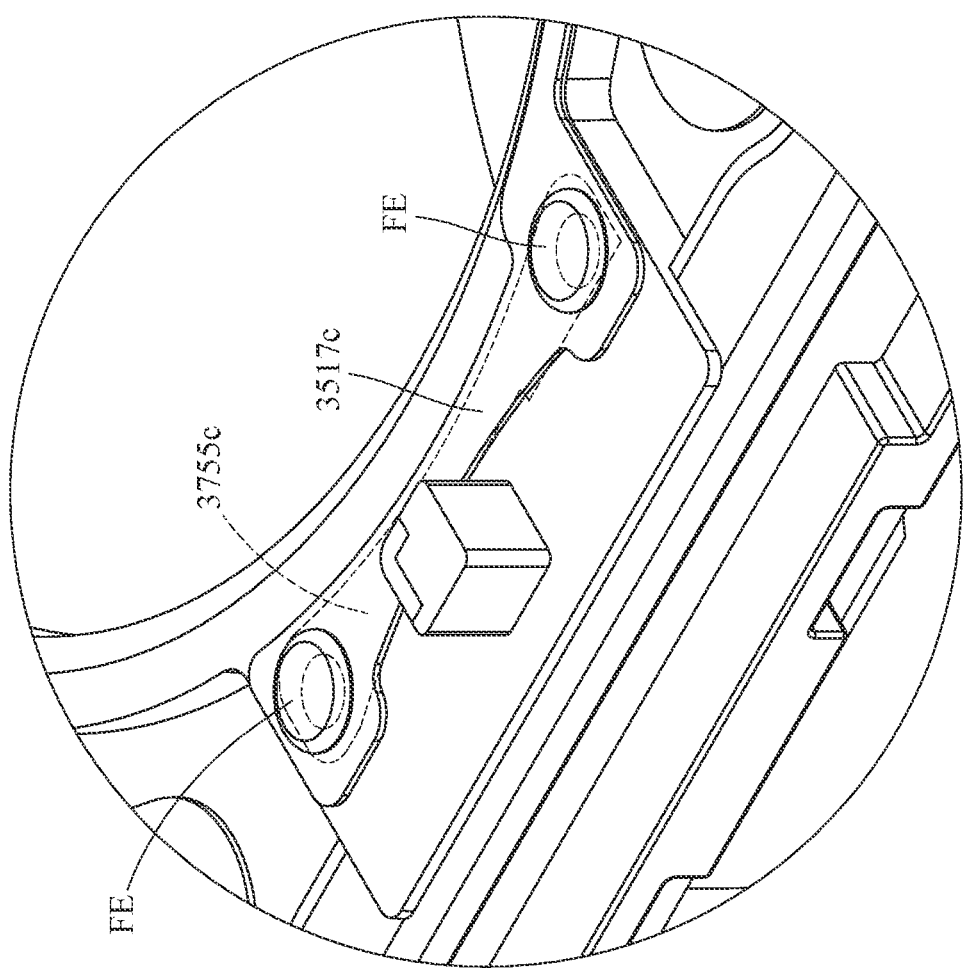
FIG. 24 is an enlarged view of region EL4 in FIG. 23.
Figure 25:
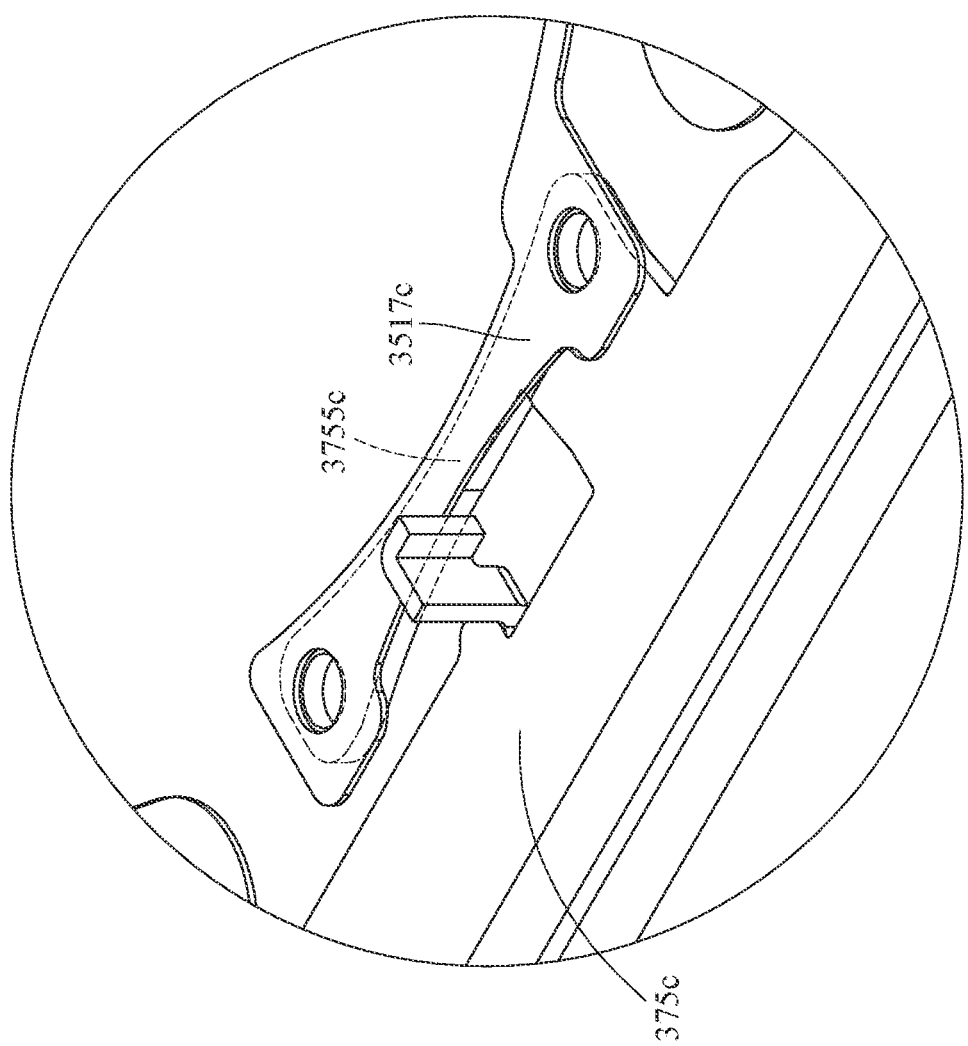
FIG. 25 is an enlarged view of the first flat spring and the ferromagnetic element in region EL 4 of FIG. 23.
Figure 26:
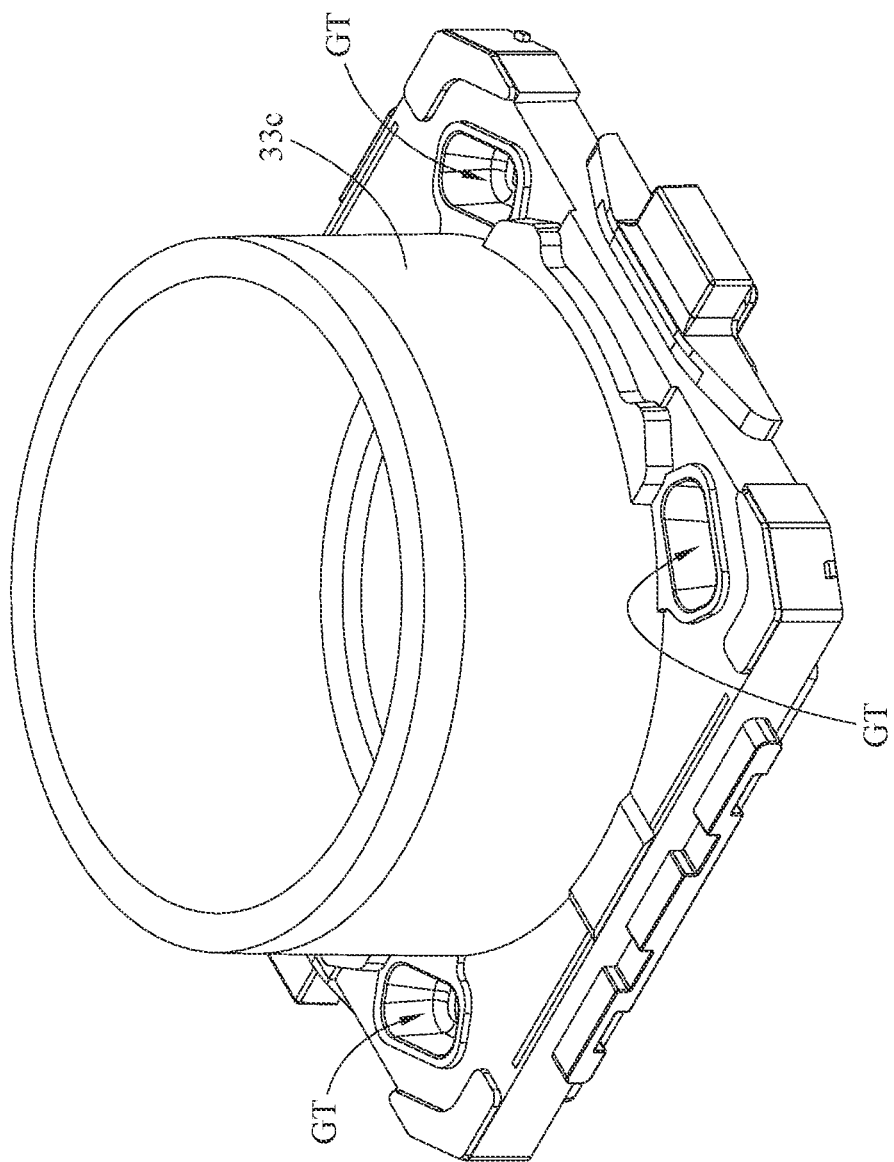
FIG. 26 is another perspective view of the mounting part and the ferromagnetic elements in FIG. 19.
Figure 27:
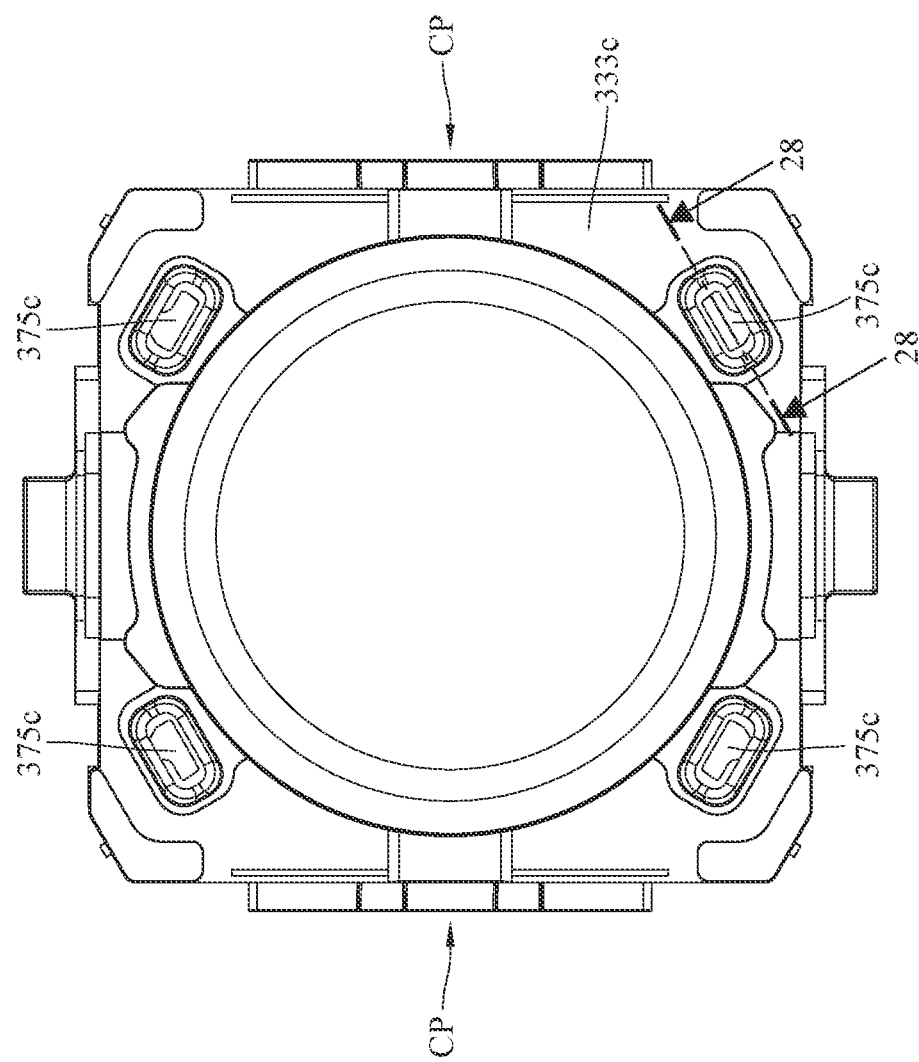
FIG. 27 is a top view of the mounting part and the ferromagnetic elements in FIG. 26.
Figure 28:
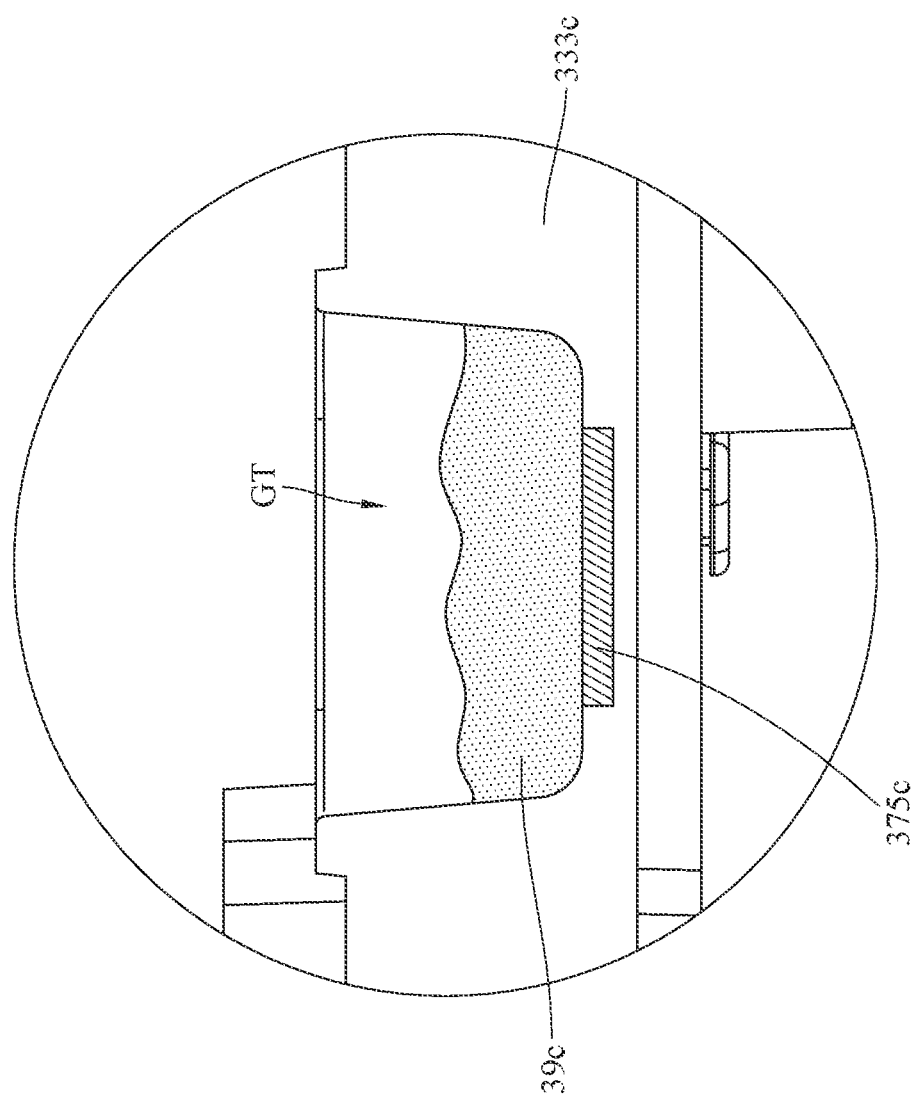
FIG. 28 is a cross-sectional view of the mounting part and the ferromagnetic element along line 28-28 in FIG. 27.

Please refer to FIG. 19 to FIG. 28. FIG. 19 is perspective view of an mounting part, driving coils, first flat springs and ferromagnetic elements of an imaging optical module according to the 3rd embodiment of the present disclosure, FIG. 20 is a perspective view of one of the ferromagnetic elements in FIG. 19, FIG. 21 is a perspective view of the ferromagnetic elements and the mounting part in FIG. 19, FIG. 22 shows the connection of one set of the driving coils, bar structures and the ferromagnetic elements in FIG. 19, FIG. 23 is a perspective view of the mounting part, the first flat springs and the ferromagnetic elements in FIG. 19, FIG. 24 is an enlarged view of region EL4 in FIG. 23, FIG. 25 is an enlarged view of the first flat spring and the ferromagnetic element in region EL 4 of FIG. 23, FIG. 26 is another perspective view of the mounting part and the ferromagnetic elements in FIG. 19, FIG. 27 is a top view of the mounting part and the ferromagnetic elements in FIG. 26, and FIG. 28 is a cross-sectional view of the mounting part and the ferromagnetic element along line 28-28 in FIG. 27.

In this embodiment, an imaging optical module 1c is provided. The imaging optical module 1c has a configuration similar to that of the imaging optical module 1 as disclosed in the 1st embodiment, and they are different from each other in that the structural features of the driving coil, first flat spring and ferromagnetic element disposed on the mounting part in this embodiment are different from that in the 1st embodiment. Said imaging optical modules of the two embodiments having similar configurations with each other refers to that except for the mounting part, driving coil, first flat spring and ferromagnetic element, elements of one of the imaging optical modules have structural features, for example, the same as that of the other of the imaging optical modules, and the details in this regard will not be provided again.

In specific, in this embodiment, each of ferromagnetic elements 375c is one-piece formed and includes a magnetic field guiding part 3751c, a first electrical connection part 3753c and a second electrical connection part 3755c. In addition, the first electrical connection part 3753c is disposed on a bar structure 3331c of a mounting part 333c and exposed on the surface of the mounting part 333c. Moreover, the tearing surface TS of the first electrical connection part 3753c faces and covers the bar structure 3331c.

Two driving coils 371c are respectively disposed at two coil mounting positions CP located at opposite sides of the mounting part 333c and corresponding to respective magnetic field guiding parts 3751c. The two coils 371c are formed by the same wire. Each of the driving coils 371c includes a wire end 3711c, and the wire end 3711c is coiled around the bar structure 3331c of the mounting part 333c and in physical contact with the first electrical connection part 3753c so as to achieve electrical connection. Therefore, when the wire end 3711c is fixed on the bar structure 3331c, the electrical connection between the driving coil 371c and the ferromagnetic element 375c is also achieved at the same time, thereby reducing assembly steps. Additionally, the driving coil 371c is in physical contact with the shearing surface SS but not the tearing surface TS of the first electrical connection part 3753c, so that the risk of the driving coil 371c being cut off by the burr BR at the intersection of the tearing surface TS and the cutting surface CS can be prevented.

Furthermore, in this embodiment, ferromagnetic-element-connecting parts 3517c of first flat springs 351c are fixed to fixing points FE of the mounting part 333c by hot riveting process, and simultaneously press the second electrical connection parts 3755c, such that the second electrical connection parts 3755c are fixed to the fixing points FE of the mounting part 333c. Therefore, the electrical connection between the ferromagnetic element 375c and the first flat spring 351c can be achieved.

Moreover, in this embodiment, an optical element driving unit 30c further includes a light blocking layer 39c. At least one part of the ferromagnetic element 375c is not covered by the mounting part 333c of a carrier 33c, and the part of the ferromagnetic element 375c not covered by the mounting part 333c is exposed on the surface of the mounting part 333c facing the object side. In addition, the light blocking layer 39c is disposed on the part of the ferromagnetic element 375c not covered by the mounting part 333c, so that the appearance would be not influenced and non-imaging light can be prevented from being reflected by the ferromagnetic element 375c into the image sensor and thus reduce flare. Furthermore, the light blocking layer 39c also works as a damping layer having a damping function. In specific, the mounting part 333c has a glue recess GT at which the exposed part of the ferromagnetic element 375c is located, and the light blocking layer 39c can be a damper disposed in the glue recess GT, such that the vibration of the carrier 33c in movement can be reduced.

4th Embodiment

Figure 29:
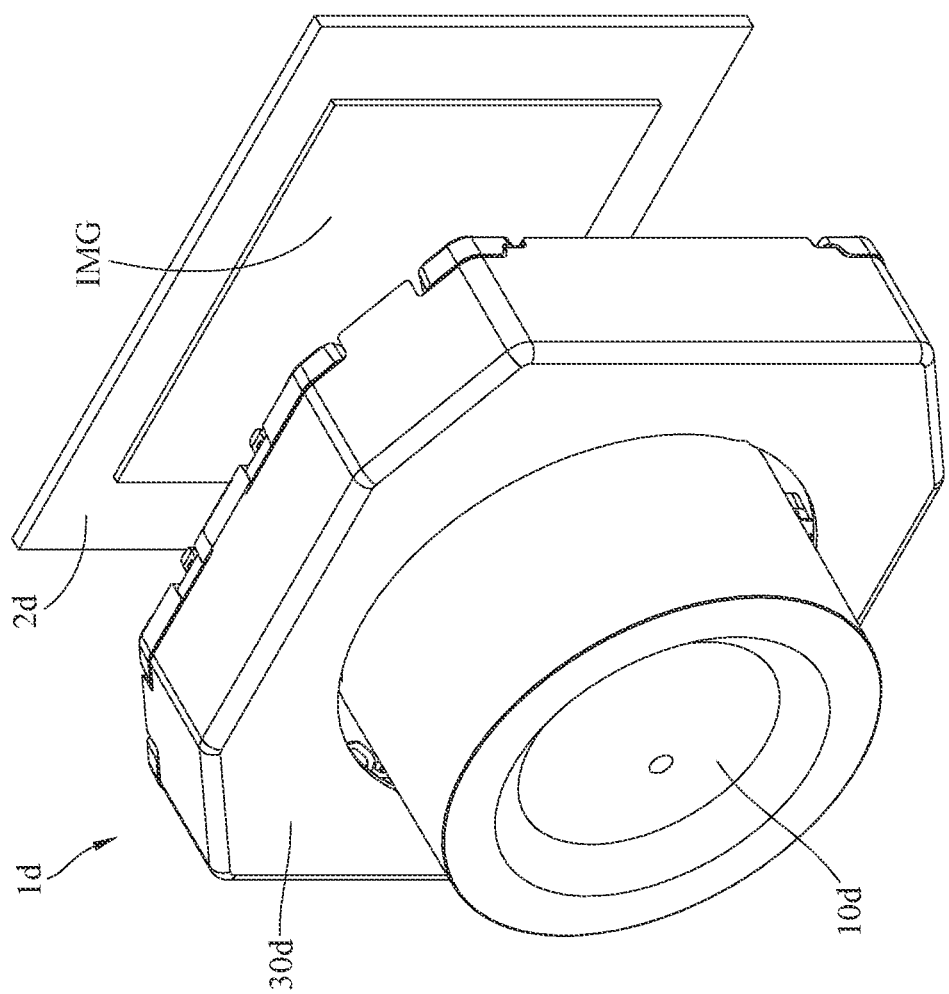
FIG. 29 is perspective view of an imaging optical module and an image sensor according to the 4th embodiment of the present disclosure.
Figure 30:
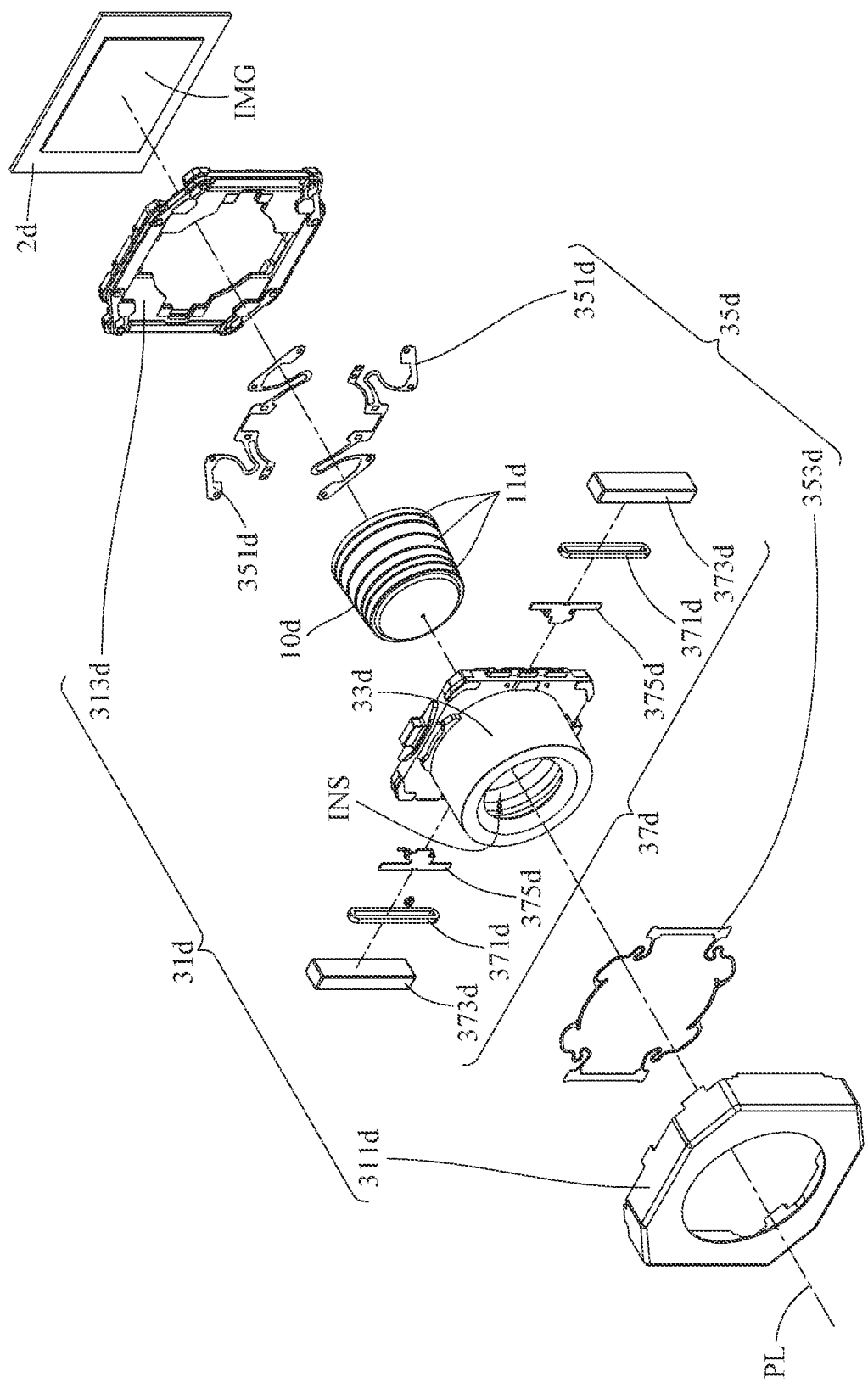
FIG. 30 is an exploded view of the imaging optical module and the image sensor in FIG. 29.
Figure 31:
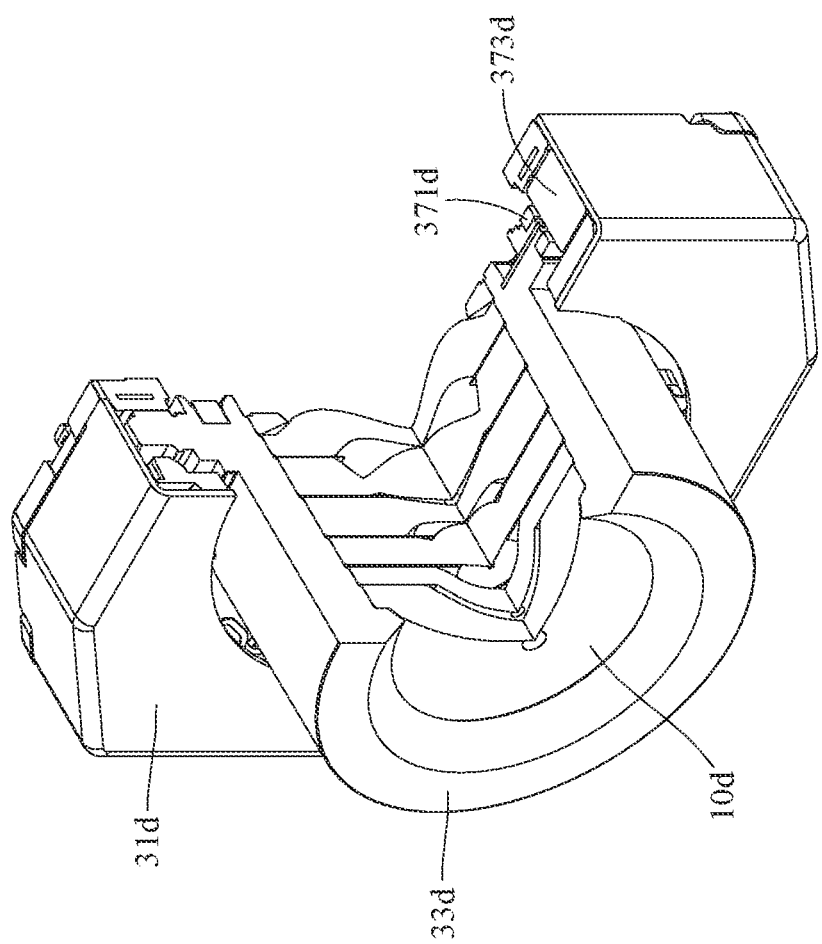
FIG. 31 is a sectional perspective view of the imaging optical module in FIG. 29.
Figure 32:
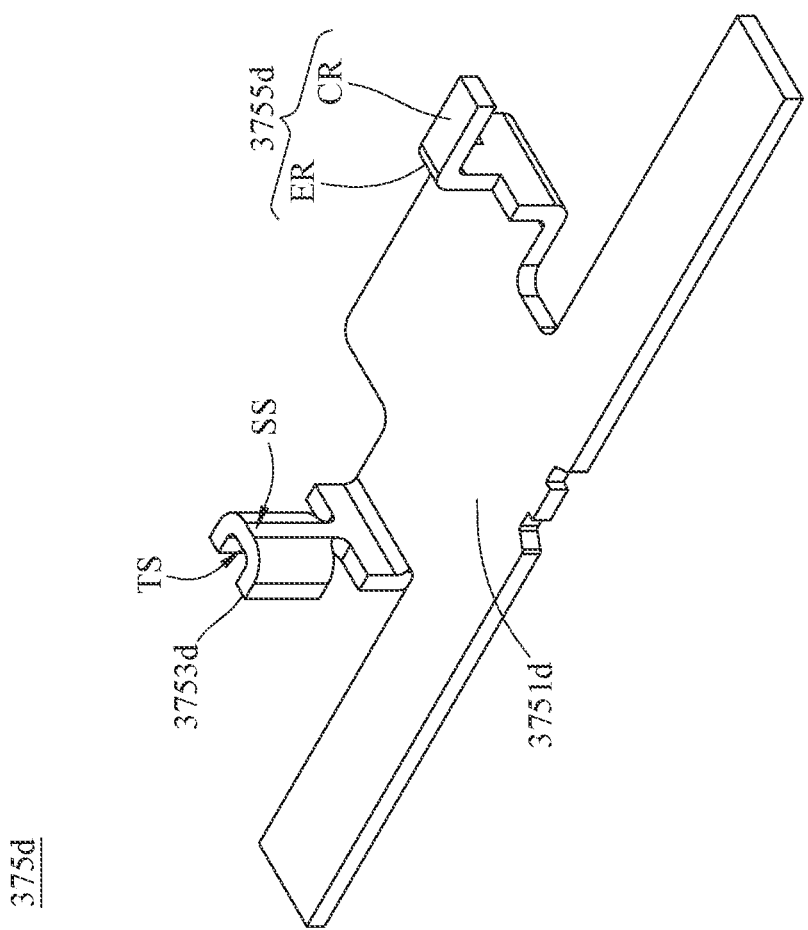
FIG. 32 is a perspective view of one ferromagnetic element in FIG. 30.
Figure 33:
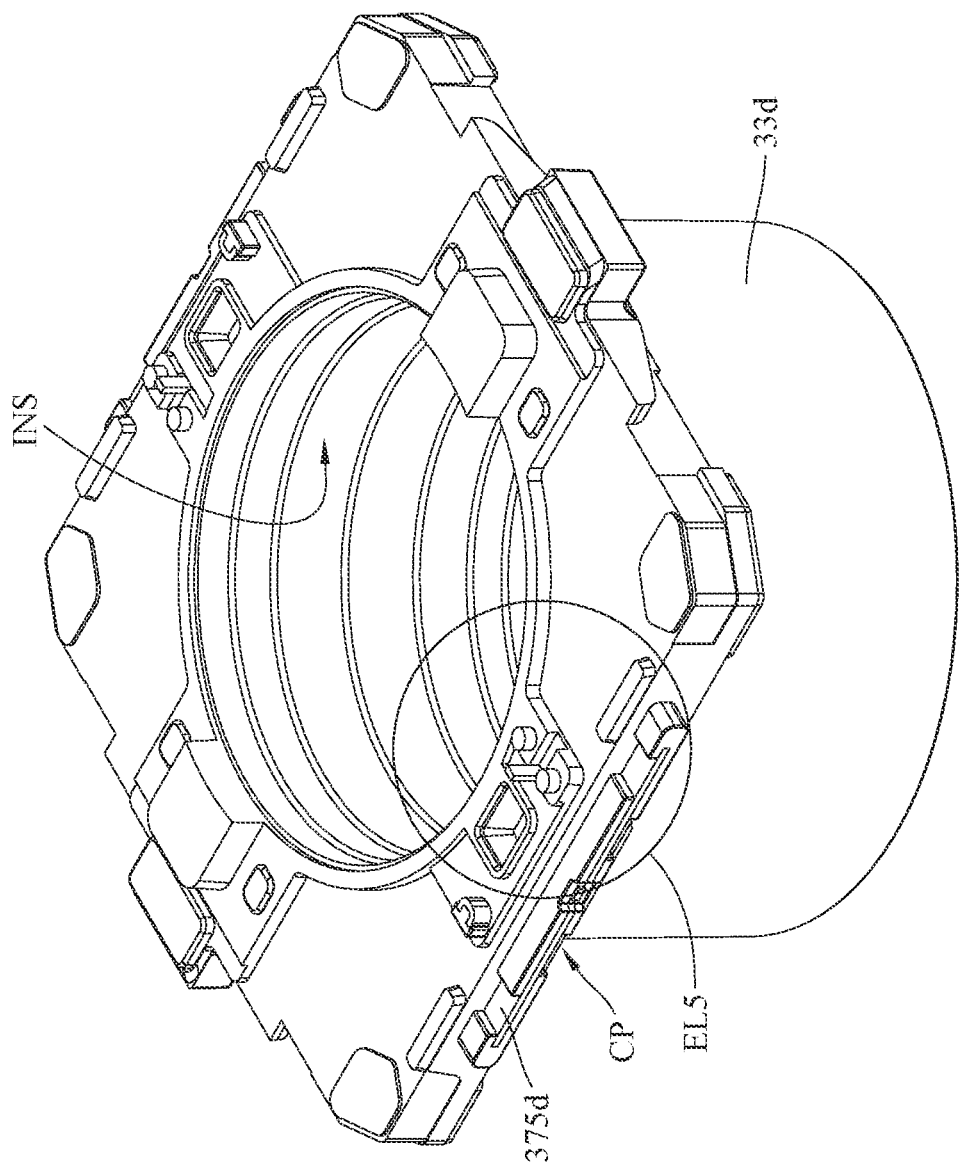
FIG. 33 is a perspective view of ferromagnetic elements and a carrier in FIG. 30 with the ferromagnetic elements embedded in the carrier.
Figure 34:
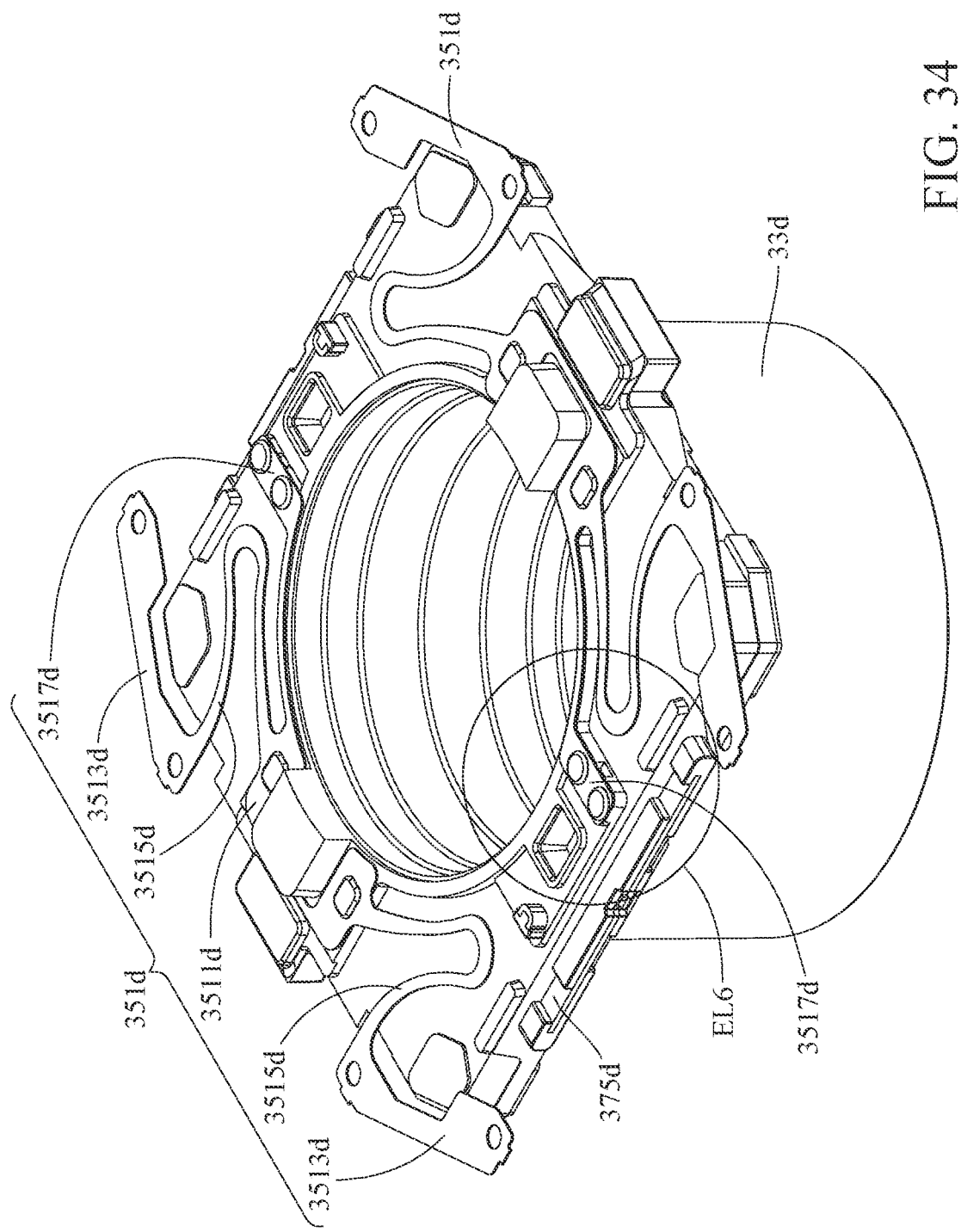
FIG. 34 is a perspective view of first flat springs, the carrier and the ferromagnetic elements in FIG. 30 with the first flat springs connected to the carrier and electrically connected to the ferromagnetic element.
Figure 35:
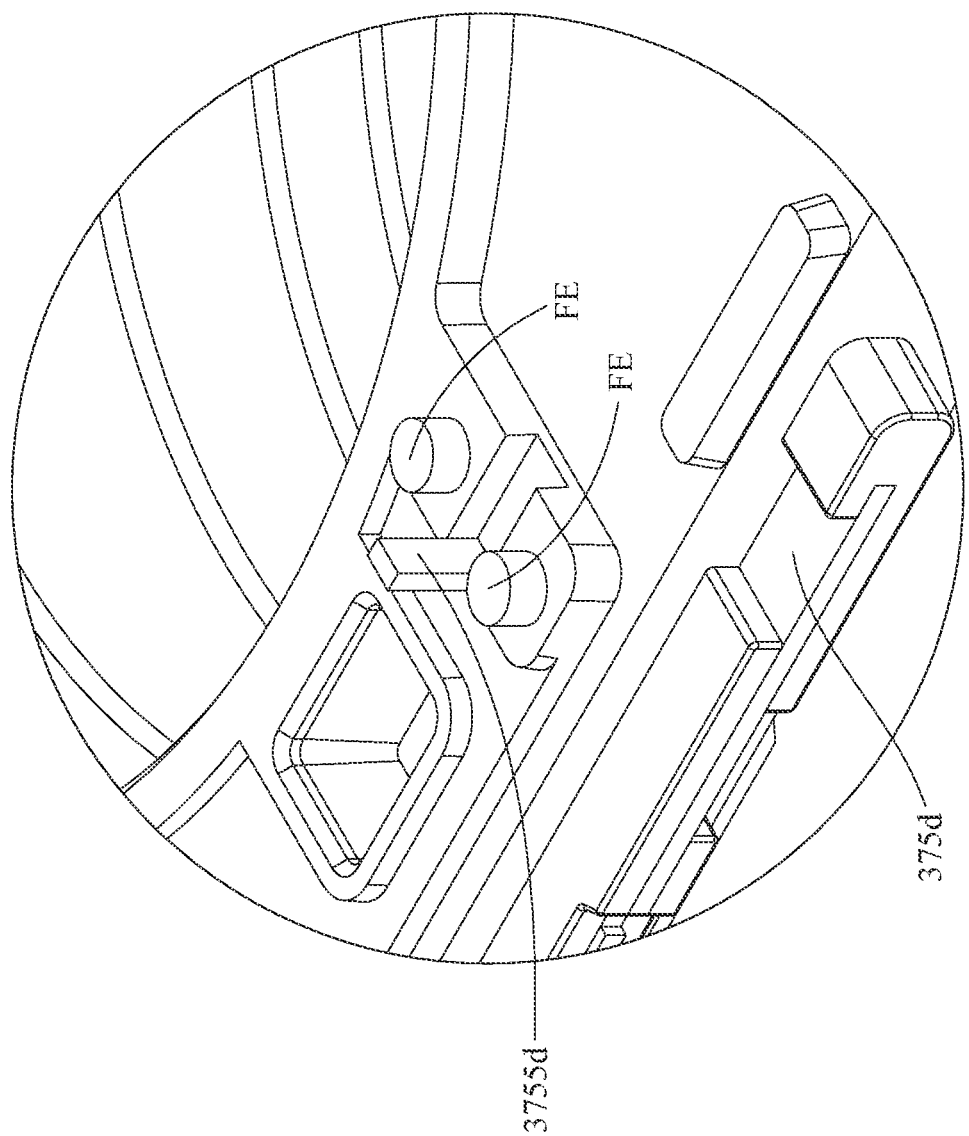
FIG. 35 is an enlarged view of region EL5 in FIG. 33.
Figure 36:
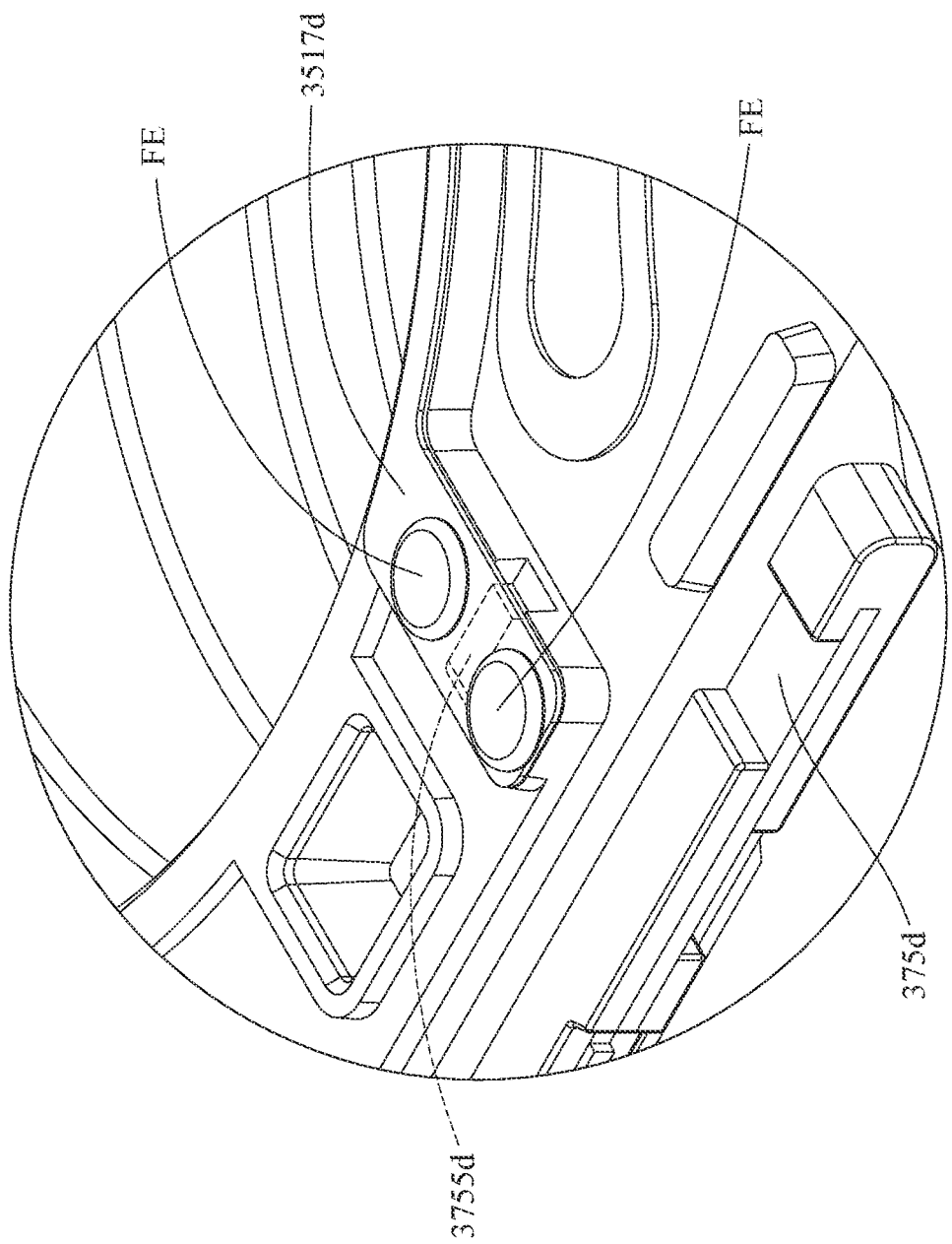
FIG. 36 is an enlarged view of region EL6 in FIG. 34.
Figure 37:
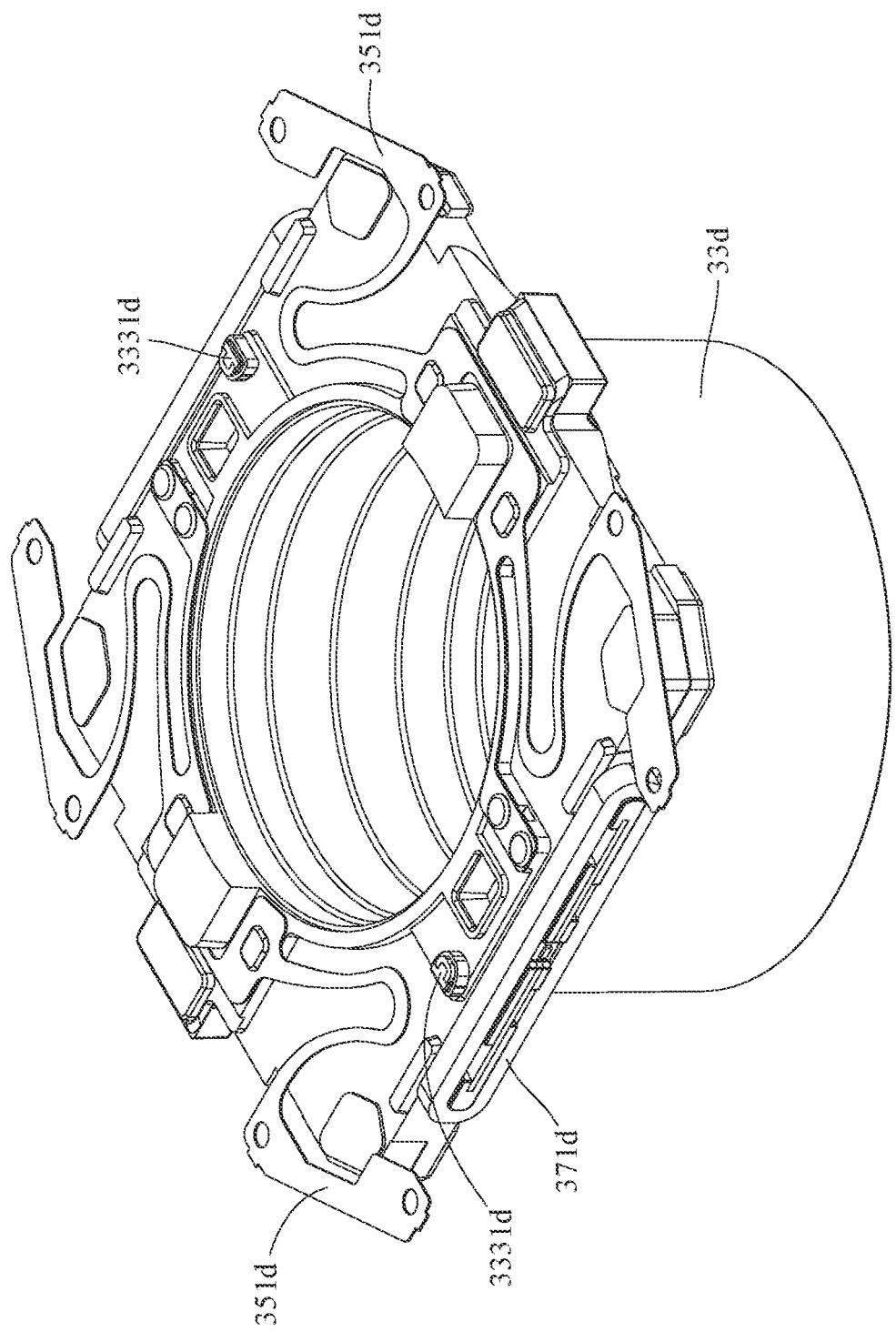
FIG. 37 is a perspective view of driving coils, the first flat springs, the carrier and the ferromagnetic elements in FIG. 30 with the driving coils and the first flat springs disposed on the carrier and electrically connected to the ferromagnetic elements.
Figure 38:
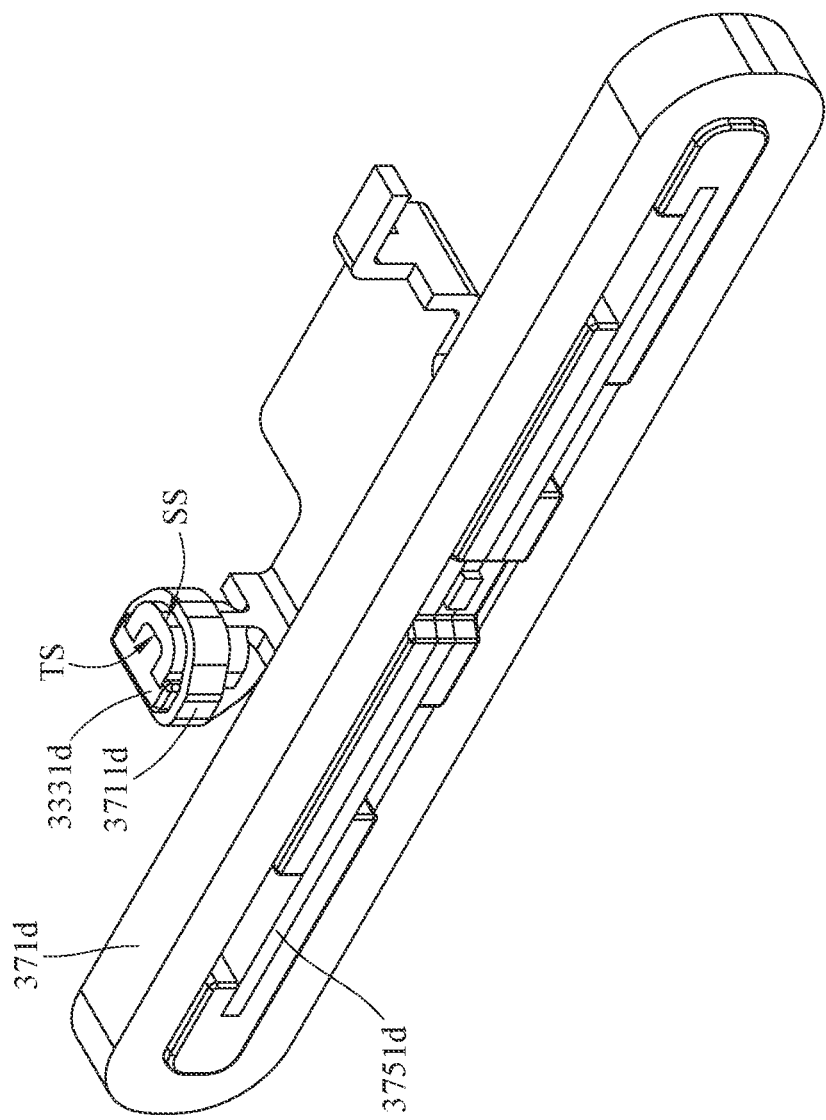
FIG. 38 shows the connection of one set of the driving coil, bar structure and the ferromagnetic elements in FIG. 30.

Please refer to FIG. 29 to FIG. 38. FIG. 29 is perspective view of an imaging optical module and an image sensor according to the 4th embodiment of the present disclosure, FIG. 30 is an exploded view of the imaging optical module and the image sensor in FIG. 29, FIG. 31 is a sectional perspective view of the imaging optical module in FIG. 29, FIG. 32 is a perspective view of one ferromagnetic element in FIG. 30, FIG. 33 is a perspective view of ferromagnetic elements and a carrier in FIG. 30 with the ferromagnetic elements embedded in the carrier, FIG. 34 is a perspective view of first flat springs, the carrier and the ferromagnetic elements in FIG. 30 with the first flat springs connected to the carrier and electrically connected to the ferromagnetic element, FIG. 35 is an enlarged view of region EL5 in FIG. 33, FIG. 36 is an enlarged view of region EL6 in FIG. 34, FIG. 37 is a perspective view of driving coils, the first flat springs, the carrier and the ferromagnetic elements in FIG. 30 with the driving coils and the first flat springs disposed on the carrier and electrically connected to the ferromagnetic elements, and FIG. 38 shows the connection of one set of the driving coil, bar structure and the ferromagnetic elements in FIG. 30.

In this embodiment, an imaging optical module 1d is provided. The imaging optical module 1d has a configuration similar to that of the imaging optical module 1 as disclosed in the 1st embodiment, and they are different from each other in that the structural features of the carrier and the driving coil, first flat spring and ferromagnetic element disposed on the carrier in this embodiment are different from that in the 1st embodiment. Said imaging optical modules of the two embodiments having similar configurations with each other refers to that except for the carrier, driving coil, first flat spring and ferromagnetic element, elements of one of the imaging optical modules have structural features, for example, the same as that of the other of the imaging optical modules.

The imaging optical module 1d includes an imaging assembly 10d and an optical element driving unit 30d. The imaging assembly 10d includes a plurality of optical elements 11d arranged along an imaging light path PL. Furthermore, an image sensor 2d is disposed on an image surface IMG of the imaging optical module 1d.

The optical element driving unit 30d includes a stationary body 31d, a carrier 33d, a supporting mechanism 35d and an electromagnetic driving assembly 37d. The stationary body 31d includes a casing 311d and a base 313d, and the casing 311d is disposed on the base 313d. The casing 311d and the base 313d together form a space for the carrier 33d, the supporting mechanism 35d and the electromagnetic driving assembly 37d to be disposed therein.

In this embodiment, the carrier 33d is one-piece formed by injection molding process, and the carrier 33d includes an inner surface INS in physical contact with the optical elements 11d, such that assembly errors can be reduced.

The supporting mechanism 35d includes two first flat springs 351d and a second flat spring 353d. The first flat springs 351d are electrically conductive and is connected to the carrier 33d and the base 313d. The second flat spring 353d connected to the carrier 33d and the casing 311d, so that the supporting mechanism 35d provides the carrier 33d with at least one degree of freedom of movement relative to the stationary body 31d. Each of the first flat springs 351d includes a carrier-connecting part 3511d, two stationary-body-connecting parts 3513d and two elastic arm parts 3515d. The carrier-connecting part 3511d is connected to the carrier 33d. The stationary-body-connecting parts 3513d are connected to the base 313d of the stationary body 31d, and the elastic arm parts 3515d are connected to respective stationary-body-connecting parts 3513d and the carrier-connecting part 3511d.

The electromagnetic driving assembly 37d is configured to move the carrier 33d relative to the stationary body 31d, and the electromagnetic driving assembly 37d includes two driving coils 371d, two driving magnets 373d and two ferromagnetic elements 375d respectively disposed on opposite sides of the carrier 33d. The two driving coils 371d are formed by the same wire.

As shown in FIG. 30, FIG. 31, FIG. 33 and FIG. 37, the driving coils 371d are disposed at coil mounting positions CP of the carrier 33d, and the driving magnets 373d are disposed on the stationary body 31d and corresponding to respective driving coils 371d.

The ferromagnetic elements 375d are coupled to the carrier 33d by, for example, injection molding process or hot riveting process, such that the ferromagnetic elements 375d are embedded in the carrier 33d having at least one degree of freedom of movement, and thus the ferromagnetic elements 375d enjoys the at least one degree of freedom of movement relative to the stationary body 31d. As shown in FIG. 32, each of the ferromagnetic elements 375d is one-piece formed and includes a magnetic field guiding part 3751d and a first electrical connection part 3753d and a second electrical connection part 3755d.

The magnetic field guiding part 3751d faces the driving coil 371d. In detail, as shown in FIG. 38, the magnetic field guiding part 3751d of the ferromagnetic element 375d is surrounded by the driving coil 371d. Therefore, the magnetic field guiding part 3751d can be magnetized by the driving coil 371d so as to increase the magnetic field intensity of the driving coil 371d.

The first electrical connection part 3753d is disposed on a bar structure 3331d of the carrier 33d and exposed on the surface of the carrier 33d, and the first electrical connection part 3753d is electrically connected to the driving coil 371d. In specific, as shown in FIG. 38, each of the driving coils 371d includes a wire end, and the wire end 3711d is coiled around the bar structure 3331d of the carrier 33d and in physical contact with the first electrical connection part 3753d so as to achieve electrical connection. Therefore, when the wire end 3711d is fixed on the bar structure 3331d, the electrical connection between the driving coil 371d and the ferromagnetic element 375d is also achieved at the same time, thereby reducing assembly steps. In this embodiment, the magnetic field guiding part 3751d faces the driving coil 371d, and the first electrical connection part 3753d is electrically connected to the driving coil 371d. Therefore, the ferromagnetic elements 375d have both functions of magnetic field guidance and circuit connection, so that the number of components of the optical element driving unit 30d can be minimized so as to increase manufacturing efficiency.

The second electrical connection part 3755d is electrically connected to the first flat spring 351d, and the first flat spring 351d and the driving coil 371d are electrically connected in series via the second electrical connection part 3755d and the first electrical connection part 3753d. Therefore, the driving coils 371d and the first flat springs 351d can be prevented from direct contact with each other, which may affect the flatness of the first flat spring 351d, so as to increase assembly yield; furthermore, the arrangements of the first flat springs 351d and the driving coils 371d in a limited space can be improved while satisfying the requirement of electrical connections of the flat spring and the driving coil, so that the design flexibility can be increased. In detail, as shown in FIG. 32 to FIG. 36, each of the first flat springs 351d further includes a ferromagnetic-element-connecting part 3517d extending from the carrier-connecting part 3511d, and each of the second electrical connection part 3755d includes a contact portion CR and an elastic portion ER. The ferromagnetic-element-connecting part 3517d is fixed to fixing points FE of the carrier 33d by hot riveting process, and simultaneously presses and bends the second electrical connection part 3755d, such that the second electrical connection part 3755d forms the contact portion CR and the elastic portion ER. Therefore, the contact portion CR is in physical contact with the first flat spring 351d, and the elastic portion ER is connected to the contact portion CR and constantly exerts an elastic force on the contact portion CR towards the first flat spring 351d. Therefore, the electrical connection between the ferromagnetic element 375d and the first flat spring 351d can be achieved and the warpage of flat spring occurring during a welding process can be prevented so as to increase assembly yield rate. In this embodiment, the ferromagnetic element 375d is formed with a shearing surface, a tearing surface and a cutting surface, and the shearing surface, the tearing surface and the cutting surface of the ferromagnetic element 375d are formed due to stamping process. The details can be referred to foregoing descriptions corresponding to FIG. 39 to FIG. 41, and the details in this regard will not be provided again. Additionally, the tearing surface TS of the first electrical connection part 3753d faces and covers the bar structure 3331d, and the driving coil 371d is in physical contact with the shearing surface SS but not the tearing surface TS of the first electrical connection part 3753d, so that the risk of the driving coil 371d being cut off by the burr BR at the intersection of the tearing surface TS and the cutting surface CS can be prevented.

In this embodiment, the direction of magnetic poles of the driving magnets 373d may be arranged according to actual functionality requirements. As such, the carrier 33d may have a degree of freedom of movement along the imaging light path PL, so that the imaging optical module 1d is provided with zooming and focusing functions; alternatively, the carrier 33d may have a degree of freedom of movement in a direction perpendicular to the imaging light path PL, so that the imaging optical module 1d is provided with optical image stabilization or optical axis tilt-shift functions. The arrangement can be similar to the arrangement as set forth in the foregoing descriptions corresponding to FIG. 42 and FIG. 43.

5th Embodiment

Figure 44:
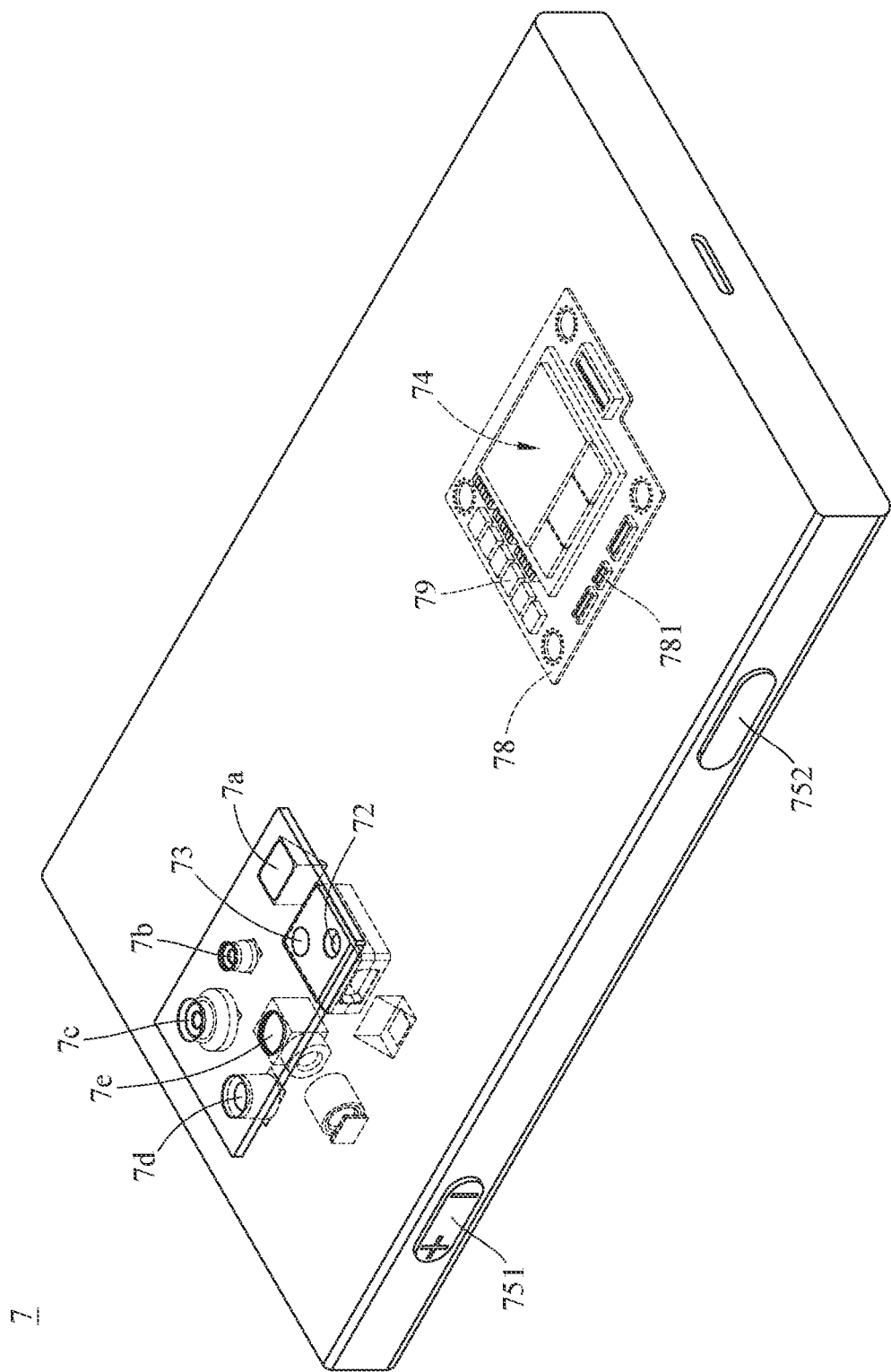
FIG. 44 is one perspective view of an electronic device according to the 5th embodiment of the present disclosure.
Figure 45:
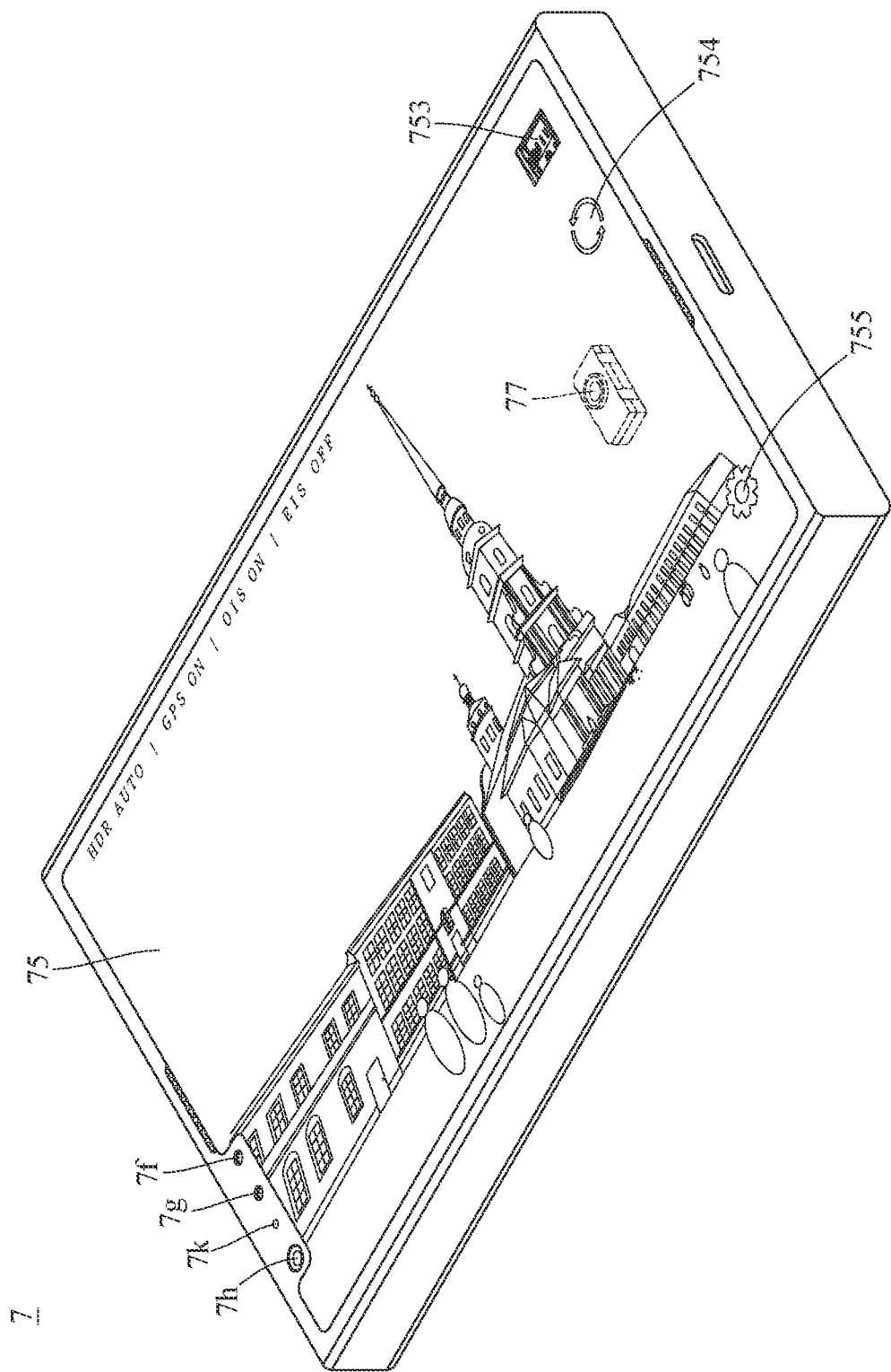
FIG. 45 is another perspective view of the electronic device in FIG. 44.
Figure 46:
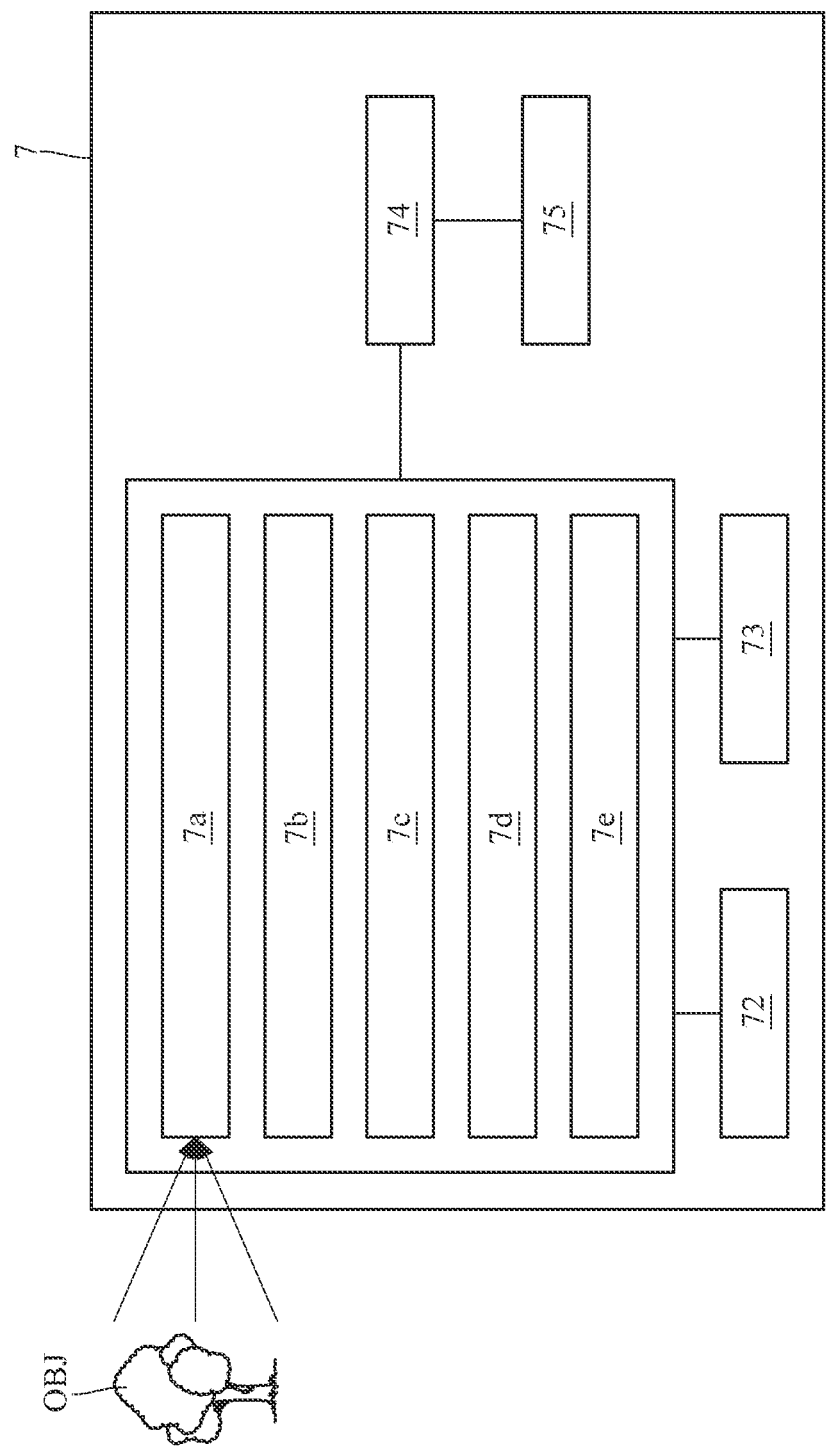
FIG. 46 is a block diagram of the electronic device in FIG. 44.

Please refer to FIG. 44 to FIG. 46. FIG. 44 is one perspective view of an electronic device according to the 5th embodiment of the present disclosure, FIG. 45 is another perspective view of the electronic device in FIG. 44, and FIG. 46 is a block diagram of the electronic device in FIG. 44.

In this embodiment, an electronic device 7 is a mobile device such as a computer, a smartphone, a smart wearable device, a camera drone, a driving recorder and displayer, and the present disclosure is not limited thereto. The electronic device 7 includes an imaging optical module 7a, an imaging optical module 7b, an imaging optical module 7c, an imaging optical module 7d, an imaging optical module 7e, an imaging optical module 7f, an imaging optical module 7g, an imaging optical module 7h, a flash module 72, a focus assist module 73, an image signal processor, a display module 75, an image software processor, a biometric identification device 77 and image sensor(s).

Each of the imaging optical module 7a, the imaging optical module 7b, the imaging optical module 7c, the imaging optical module 7d, the imaging optical module 7e, the imaging optical module 7f, the imaging optical module 7g and the imaging optical module 7h may include the optical element driving unit and the imaging assembly.

The imaging optical module 7a, the imaging optical module 7b, the imaging optical module 7c, the imaging optical module 7d and the imaging optical module 7e are disposed on the same side of the electronic device 7. The imaging optical module 7f, the imaging optical module 7g, the imaging optical module 7h and the display module 75 are disposed on the opposite side of the electronic device 7. The display module 75 can be a user interface, so that the imaging optical modules 7f, 7g and 7h can be front-facing cameras of the electronic device 7 for taking selfies, but the present disclosure is not limited thereto.

Figure 47:
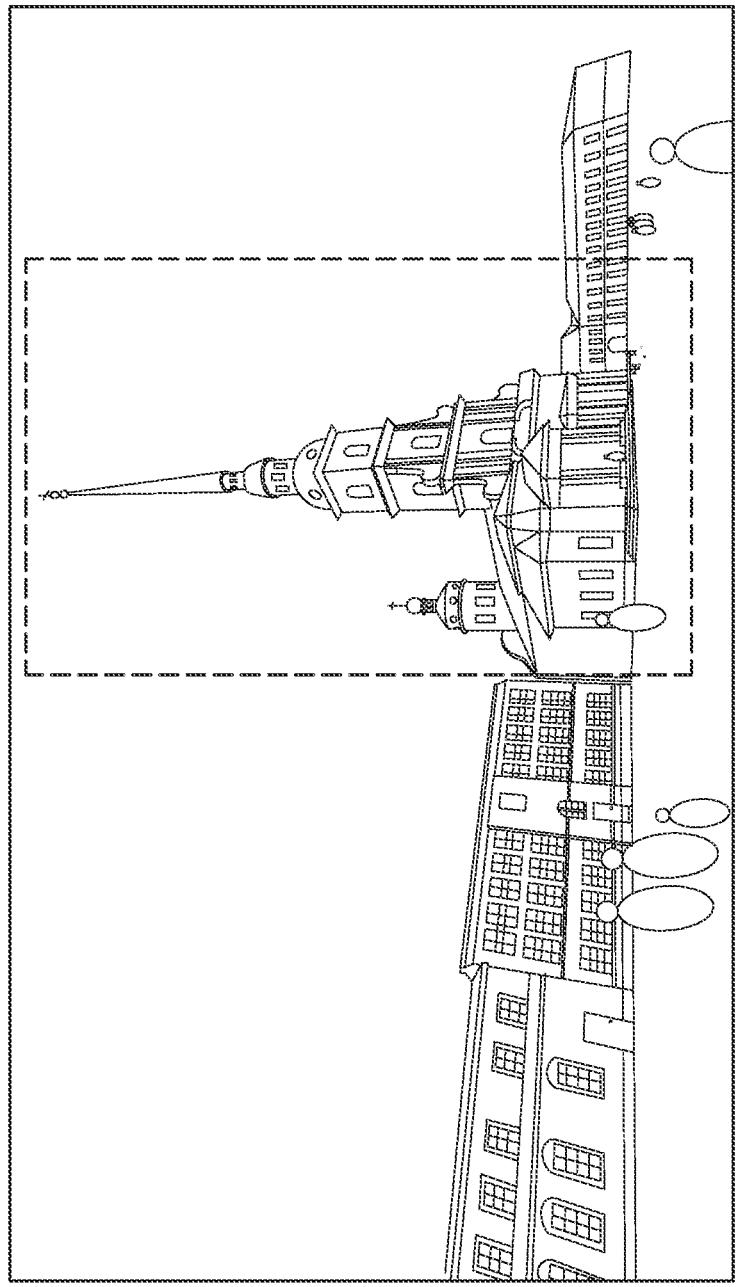
FIG. 47 shows an image captured by the electronic device in FIG. 44 with an equivalent focal length ranging between 11 mm and 14 mm.
Figure 48:
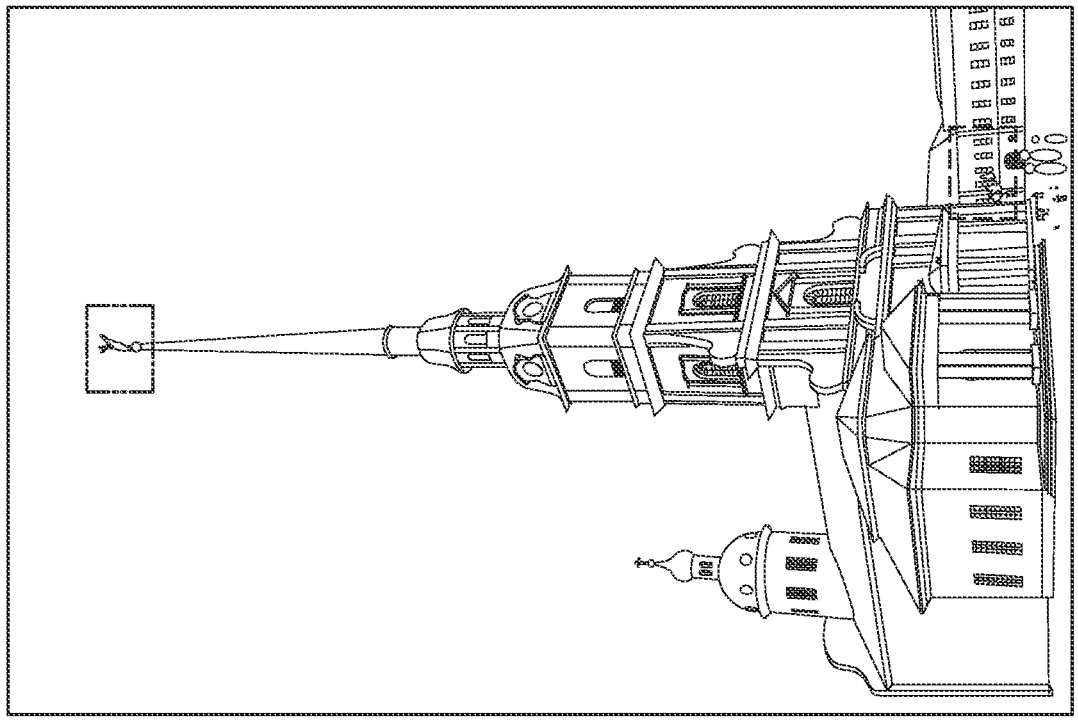
FIG. 48 shows an image captured by the electronic device in FIG. 44 with an equivalent focal length ranging between 22 mm and 30 mm.
Figure 49:
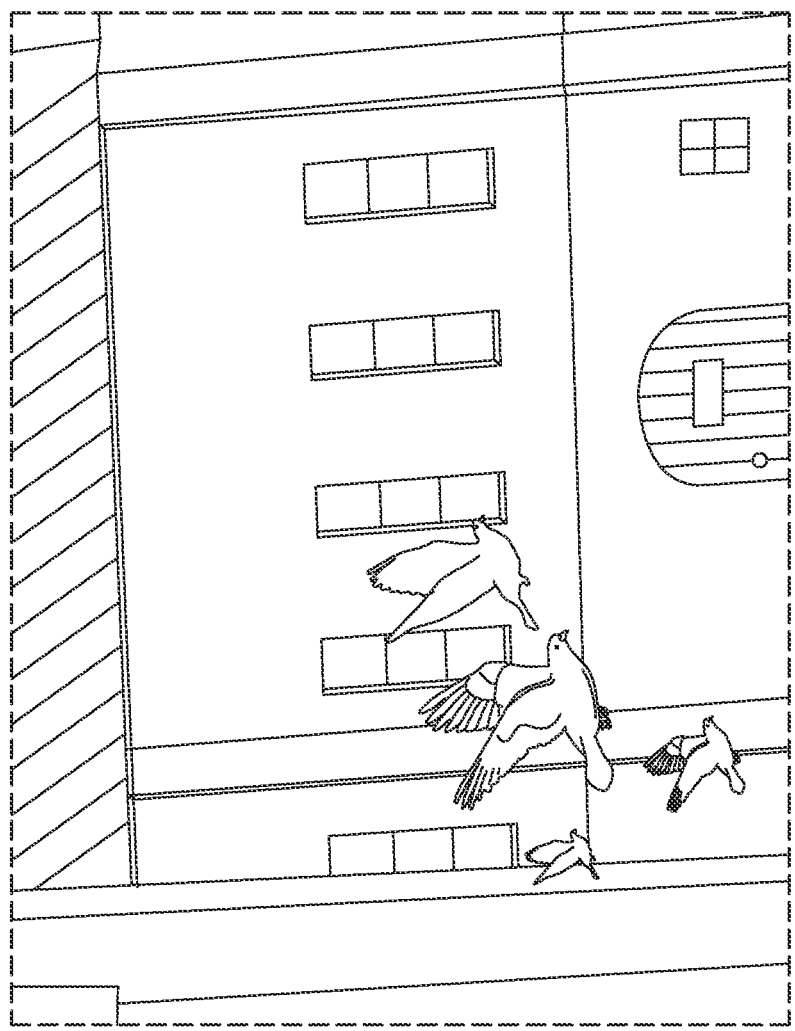
FIG. 49 shows an image captured by the electronic device in FIG. 44 with an equivalent focal length ranging between 60 mm and 300 mm.
Figure 50:
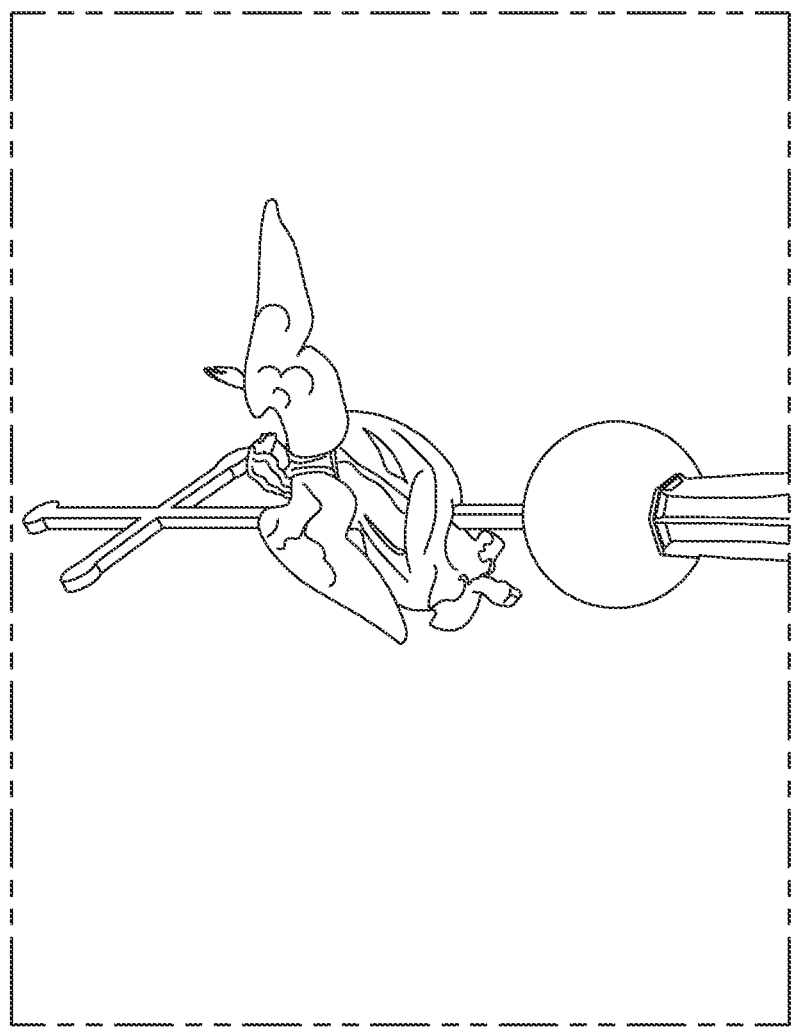
FIG. 50 shows an image captured by the electronic device in FIG. 44 with an equivalent focal length ranging between 400 mm and 600 mm.

The imaging optical module 7a is an ultra-telephoto image capturing module, the imaging optical module 7b is a macro-photo image capturing module, the imaging optical module 7c is a wide-angle image capturing module, the imaging optical module 7d is an ultra-wide-angle image capturing module, the imaging optical module 7e is a telephoto image capturing module, the imaging optical module 7f is an ultra-wide-angle image capturing module, the imaging optical module 7g is a wide-angle image capturing module and the imaging optical module 7h is a ToF (time of flight) image capturing module. In this embodiment, the imaging optical module 7a, the imaging optical module 7b, the imaging optical module 7c, the imaging optical module 7d and the imaging optical module 7e have different fields of view, such that the electronic device 7 can have various magnification ratios so as to meet the requirement of optical zoom functionality. For example, the ultra-wide-angle image capturing module 7d with the maximum field of view ranging between 105 degrees and 125 degrees can achieve an image with an equivalent focal length between 11 mm and 14 mm. In this case, the image captured by the ultra-wide-angle image capturing module 7d can refer to which shows an image captured by the electronic device 7 with an equivalent focal length ranging between 11 mm and 14 mm, and the captured image as shown in FIG. 47 includes the whole cathedral, surrounding buildings and people on the square. The captured image as shown in FIG. 47 has a relatively large field of view and depth of view, but it often has a relatively large degree of distortion. The wide-angle image capturing module 7c with the maximum field of view ranging between 70 degrees and 90 degrees can achieve an image with an equivalent focal length between 22 mm and 30 mm. In this case, the image captured by the wide-angle image capturing module 7c can refer to FIG. 48, which shows an image captured by the electronic device 7 with an equivalent focal length ranging between 22 mm and 30 mm, and the captured image as shown in FIG. 48 includes the whole cathedral and people in front of the cathedral. The zoom-telephoto image capturing module 7e with the maximum field of view ranging between 10 degrees and 40 degrees can achieve an image with an equivalent focal length between 60 mm and 300 mm, and the zoom-telephoto image capturing module 7e can be regarded as able to provide 5× magnification. In this case, the image captured by the zoom-telephoto image capturing module 7e can refer to FIG. 49, which shows an image captured by the electronic device 7 with an equivalent focal length ranging between 60 mm and 300 mm, and the captured image as shown in FIG. 49 includes the birds flying in front of the cathedral. The captured image as shown in FIG. 49 has a relatively small field of view and depth of view, and the zoom-telephoto image capturing module 7e can be used for shooting moving targets. For this, an optical element driving unit can drive the imaging assembly to quickly and continuously autofocus on the target, such that the captured image of the target would not be blurred due to long focusing distance. When imaging, the zoom-telephoto image capturing module 7e can further perform optical zoom for imaged objects so as to obtain clearer images. Said magnification ratio of one image capturing module is defined as a ratio of the maximum focal length to the minimum focal length of the image capturing module. For instance, the magnification ratio of the zoom-telephoto image capturing module 7e is 5× magnification. The ultra-telephoto image capturing module 7a with the maximum field of view ranging between 4 degrees and 8 degrees can achieve an image with an equivalent focal length between 400 mm and 600 mm. In this case, the image captured by the ultra-telephoto image capturing module 7a can refer to FIG. 50, which shows an image captured by the electronic device 7 with an equivalent focal length ranging between 400 mm and 600 mm, and the captured image as shown in FIG. 50 includes the angel-and-cross-topped spire of the cathedral. The captured image as shown in FIG. 50 has a smaller field of view and depth of view, and the imaging assembly of the ultra-telephoto image capturing module 7a may easily capture an out of focus image due to slight camera shake. For this, the optical element driving unit can provide a feedback force to correct the shake so as to achieve optical image stabilization while providing a force to drive the imaging assembly of the ultra-telephoto image capturing module 7a to focus on a target. In addition, the imaging optical module 7h can determine depth information of the imaged object. In this embodiment, the electronic device 7 includes multiple imaging optical module 7a, 7b, 7c, 7d, 7e, 7f, 7g and 7h, but the present disclosure is not limited to the number and arrangement of imaging optical modules. The equivalent focal lengths to which the abovementioned imaging optical modules correspond are estimated values based on particular conversion functions, and the estimated values may be different from actual focal lengths of the imaging optical module due to designs of the imaging assemblies and sizes of the image sensors.

When a user captures images of an object OBJ, light rays converge in the imaging optical module 7a, the imaging optical module 7b, the imaging optical module 7c, the imaging optical module 7e or the imaging optical module 7f to generate images, and the flash module 72 is activated for light supplement. The focus assist module 73 detects the object distance of the imaged object OBJ to achieve fast auto focusing. The image signal processor is configured to optimize the captured image to improve image quality. The light beam emitted from the focus assist module 73 can be either conventional infrared or laser.

In addition, the light rays may converge in the imaging optical module 7f, 7g or 7h to generate images. The electronic device 7 can include a reminder light 7k that can be illuminated to remind the user that the imaging optical module 7f, 7g or 7h of the electronic device 7 is working. The display module 75 can be a touch screen or physical buttons such as a zoom button 751 and a shutter release button 752. The user is able to interact with the display module 75 and the image software processor having multiple functions to capture images and complete image processing. The image processed by the image software processor can be displayed on the display module 75. The user can replay the previously captured image through an image playback button 753 of the display module 75, can choose a suitable imaging optical module for shooting through an imaging optical modules switching button 754 of the display module 75, and can properly adjust shooting parameters according to current shooting situations through an integrated menu button 755 of the display module 75.

Further, the electronic device 7 further includes a circuit board 78 and a plurality of electronic components 79 disposed on the circuit board 78. The imaging optical module 7a, 7b, 7c, 7d, 7e, 7f, 7g, and 7h are electrically connected to the electronic components 79 via connectors 781 on the circuit board 78. The electronic components 79 can include a signal emitting module and can transmit image(s) to other electronic device or a cloud storage via the signal emitting module. The signal emitting module can be a wireless fidelity (WiFi) module, a Bluetooth module, an infrared module, a network service module or an integrated module for transmitting various signals mentioned above, and the present disclosure is not limited thereto.

The electronic components 79 can also include a storage unit, a random access memory for storing image information, a gyroscope, and a position locator for facilitating the navigation or positioning of the electronic device 7. In this embodiment, the image signal processor, the image software processor and the random access memory are integrated into a single chip system 74, but the present disclosure is not limited thereto. In some other embodiments, the electronic components can also be integrated in the imaging optical module s or can also be disposed on one of the circuit boards. In addition, the user can use the biometric identification device 77 to turn on and unlock the electronic device 7.

The smartphone in this embodiment is only exemplary for showing the optical element driving unit and the imaging optical module of the present disclosure installed in an electronic device, and the present disclosure is not limited thereto. The optical element driving unit and the imaging optical module can be optionally applied to optical systems with a movable focus. Furthermore, the optical element driving unit and the imaging optical module feature good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical element driving unit, comprising:
    a stationary body;
    a carrier, configured for at least one optical element to be disposed thereon, wherein the carrier has at least one degree of freedom of movement relative to the stationary body;
    a supporting mechanism, connected to the carrier and the stationary body, wherein the supporting mechanism provides the carrier with the at least one degree of freedom of movement relative to the stationary body; and
    an electromagnetic driving assembly, configured to move the carrier relative to the stationary body, wherein the electromagnetic driving assembly comprises:
        a driving coil, disposed on the carrier;
        a driving magnet, disposed on the stationary body and disposed corresponding to the driving coil; and
        a ferromagnetic element, embedded in the carrier, wherein the ferromagnetic element has the at least one degree of freedom of movement relative to the stationary body, the ferromagnetic element is one-piece formed and comprises a magnetic field guiding part and a first electrical connection part, the magnetic field guiding part faces at least one of the driving coil and the driving magnet, the first electrical connection part is exposed on a surface of the carrier, and the first electrical connection part is electrically connected to the driving coil;
    wherein the supporting mechanism comprises a flat spring, and the flat spring is electrically conductive;
    wherein the ferromagnetic element further comprises a second electrical connection part, the second electrical connection part is electrically connected to the flat spring, and the flat spring and the driving coil are electrically connected in series via the second electrical connection part and the first electrical connection part.

2. The optical element driving unit of claim 1, wherein the driving magnet has a corresponsive surface, and the corresponsive surface faces both the magnetic field guiding part and the driving coil;
    wherein the magnetic field guiding part is located farther away from the corresponsive surface than the driving coil to the corresponsive surface.

3. The optical element driving unit of claim 1, wherein the magnetic field guiding part of the ferromagnetic element is surrounded by the driving coil.

4. The optical element driving unit of claim 1, wherein the second electrical connection part comprises:
    a contact portion, in physical contact with the flat spring; and
    an elastic portion, connected to the contact portion and constantly exerting an elastic force on the contact portion towards the flat spring.

5. The optical element driving unit of claim 1, wherein the ferromagnetic element is integrally formed with the carrier by an insert molding process.

6. The optical element driving unit of claim 1, wherein the carrier comprises:
    a barrel part, wherein the at least one optical element is disposed on the barrel part; and
    a mounting part, wherein the barrel part, the supporting mechanism, the driving coil and the ferromagnetic element are disposed on the mounting part.

7. The optical element driving unit of claim 1, wherein the carrier is one-piece formed by an injection molding process, the carrier has an inner surface, and the inner surface is in physical contact with the at least one optical element.

8. The optical element driving unit of claim 1, wherein the ferromagnetic element is formed by a stamping process, and the ferromagnetic element has:
    a shearing surface;
    a tearing surface, opposite to the shearing surface; and
    a cutting surface, connected to the shearing surface and the tearing surface;
    wherein the driving coil is not in physical contact with the tearing surface.

9. The optical element driving unit of claim 8, wherein the first electrical connection part of the ferromagnetic element is disposed on a bar structure of the carrier;
    wherein a part of the tearing surface located at the first electrical connection part faces the bar structure, and a part of the shearing surface located at the first electrical connection part is in physical contact with the driving coil.

10. The optical element driving unit of claim 1, wherein at least one part of the ferromagnetic element is not covered by the carrier;
    wherein the optical element driving unit further comprises a light blocking layer, and the light blocking layer is disposed on the at least one part of the ferromagnetic element.

11. The optical element driving unit of claim 1, wherein at least one part of the ferromagnetic element is not covered by the carrier;
    wherein the optical element driving unit further comprises an electrical insulating barrier layer, and the electrical insulating barrier layer is disposed on the at least one part of the ferromagnetic element.

12. An imaging optical module, comprising:
    the optical element driving unit of claim 1; and
    an imaging assembly, comprising the at least one optical element, wherein the at least one optical element is located at an imaging light path.

13. The imaging optical module of claim 12, wherein the carrier has a degree of freedom of movement along the imaging light path.

14. The imaging optical module of claim 12, wherein the carrier has a degree of freedom of movement in a direction perpendicular to the imaging light path.

15. An electronic device, comprising:
    the imaging optical module of claim 12; and an image sensor, disposed on an image surface of the imaging optical module.

* * * * *